(12) United States Patent
Hayase et al.

(10) Patent No.: US 12,049,909 B2
(45) Date of Patent: Jul. 30, 2024

(54) FLOW PATH SWITCHING DEVICE

(71) Applicant: DENSO CORPORATION, Kariya (JP)

(72) Inventors: Tomohiro Hayase, Kariya (JP); Nobuharu Kakehashi, Kariya (JP); Yuhei Kunikata, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 18/152,670

(22) Filed: Jan. 10, 2023

(65) Prior Publication Data

US 2023/0141026 A1  May 11, 2023

Related U.S. Application Data

(63) Continuation of application No. PCT/JP2021/024288, filed on Jun. 28, 2021.

(30) Foreign Application Priority Data

Jul. 23, 2020  (JP) ................. 2020-125898

(51) Int. Cl.
*F16K 27/00* (2006.01)
*F15B 11/12* (2006.01)
*F16K 27/02* (2006.01)

(52) U.S. Cl.
CPC .......... *F15B 11/126* (2013.01); *F16K 27/003* (2013.01); *F16K 27/0209* (2013.01)

(58) Field of Classification Search
CPC .......... F16K 27/041; F16K 3/26; F16K 3/265; F16L 37/35; F16L 37/107
See application file for complete search history.

(56) References Cited

U.S. PATENT DOCUMENTS

| | | | |
|---|---|---|---|
| 2018/0274689 A1* | 9/2018 | Gagne | B29C 66/01 |
| 2019/0162324 A1* | 5/2019 | Tanaka | F16K 11/24 |
| 2019/0376473 A1* | 12/2019 | Makino | F16K 31/04 |

FOREIGN PATENT DOCUMENTS

| | | |
|---|---|---|
| JP | 2014037716 A | 2/2014 |
| WO | WO-2020175262 A1 | 9/2020 |

* cited by examiner

*Primary Examiner* — P. Macade Nichols
(74) *Attorney, Agent, or Firm* — Harness, Dickey & Pierce, P.L.C.

(57) ABSTRACT

A flow path switching device includes: a first passage portion; a second passage portion; a first cover member attached to the first passage portion; and a second cover member attached to the second passage portion. The first passage portion includes a first passage connected to a fluid circuit and having a groove shape. The second passage portion includes a second passage connected to the fluid circuit to communicate with the first passage at a plurality of places and having a groove shape. The first passage portion, the second passage portion, and a drive unit are stacked in this order. The first cover member includes: a sealing portion to seal an opened portion of the first passage; and an opening arranged along an outer edge of the opened portion of the first passage.

6 Claims, 14 Drawing Sheets

FLOW PATH SWITCHING DEVICE

CROSS REFERENCE TO RELATED APPLICATION

The present application is a continuation application of International Patent Application No. PCT/JP2021/024288 filed on Jun. 28, 2021, which designated the U.S. and claims the benefit of priority from Japanese Patent Application No. 2020-125898 filed on Jul. 23, 2020. The entire disclosures of all of the above applications are incorporated herein by reference.

TECHNICAL FIELD

The present disclosure relates to a flow path switching device.

BACKGROUND ART

In a fluid circuit, plural switch valves are arranged in order to realize a passage configuration according to an application. For example, in a water supply pump device, a first switch valve to a fifth switch valve are adopted to switch passage configurations, and the switching is performed among passage configurations of five patterns by controlling the operations of the first switch valve to the fifth switch valve.

SUMMARY

According to an aspect of the present disclosure, a flow path switching device for a fluid circuit in which a fluid circulates includes a main body member, a drive unit, a first cover member, and a second cover member. The main body member includes a first passage portion and a second passage portion. The first passage portion has a first passage connected to the fluid circuit, and the first passage has a groove shape where one surface of the main body member is opened. The second passage portion has a second passage that communicates with the first passage at a plurality of places and connected to the fluid circuit. The second passage has a groove shape where another surface of the main body member is opened. The drive unit drives valve body portions in conjunction to adjust a flow rate of a fluid passing through a communication passage that communicates the first passage and the second passage. The first cover member is attached to a surface of the first passage portion. The second cover member is attached to a surface of the second passage portion. The first passage portion, the second passage portion, and the drive unit are stacked in this order. The first cover member includes: a sealing portion and an opening. The sealing portion is arranged to seal an opened portion of the first passage, when the first cover member is attached to the surface of the first passage portion. The opening is arranged along an outer edge of the opened portion of the first passage and is formed to communicate a side of the main body member to an external side.

BRIEF DESCRIPTION OF DRAWINGS

The above object and other objects, features, and advantages of the present disclosure will become more apparent from the following detailed description with reference to the accompanying drawings. In the accompanying drawings.

DESCRIPTION OF EMBODIMENTS

Figure 1:
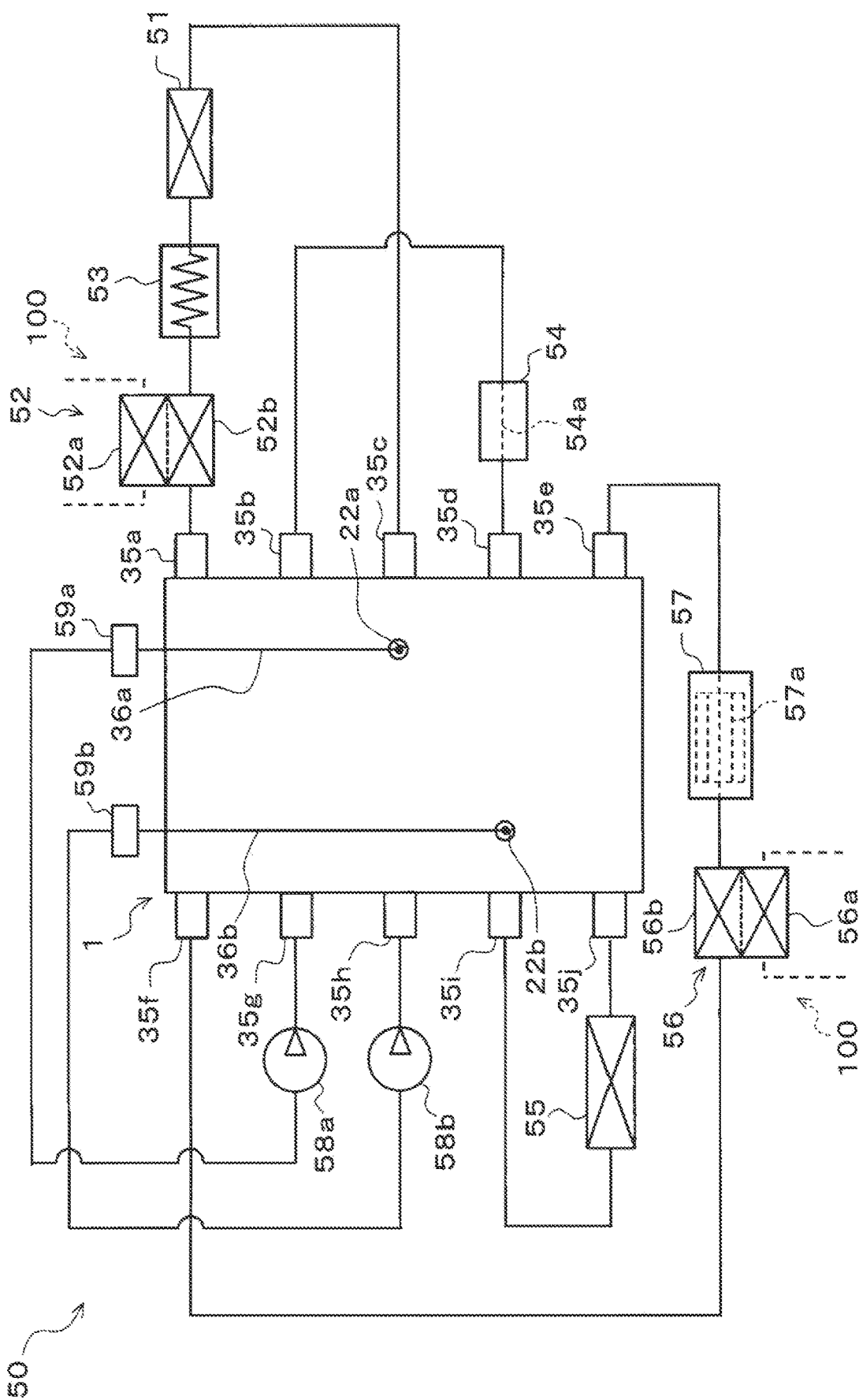
FIG. 1 is a schematic configuration view of a flow path switching device according to a first embodiment.

To begin with, examples of relevant techniques will be described. In a conventional fluid circuit, plural switch valves are arranged in order to realize a passage configuration according to an application. For example, in a water supply pump device, a first switch valve to a fifth switch valve are adopted to switch passage configurations, and the switching is performed among passage configurations of five patterns by controlling the operations of the first switch valve to the fifth switch valve.

The first switch valve to the fifth switch valve are respectively connected via a large number of pipes and joints. Therefore, the configuration for switching the passages increases in size, which affects the space and weight of the entire device.

In addition, a drive unit related to the switching operation is required for each of the first switch valve to the fifth switch valve. Therefore, when the drive unit for each switch valve is taken into consideration, it is considered that there is room for further improvement in the space and weight of the configurations for switching the passages.

Then, in a case where a flow path switching device is manufactured by compactly arranging configurations for switching passages, each of the configurations is required to be accurately arranged. As a result, it is assumed that workability in the manufacturing may be deteriorated. For example, it is considered that fluid may leak from the passage depending on joining accuracy between members when the flow path switching device is manufactured. In order to cope with the leakage of the fluid, it is assumed that workability in the manufacturing may be deteriorated. The present disclosure provides a flow path switching device capable of switching a passage configuration of a fluid circuit by a compact configuration so as to improve the work efficiency in manufacturing.

A flow path switching device according to an aspect of the present disclosure switches a passage configuration of a fluid circuit in which a fluid circulates. The flow path switching device includes a main body member, a drive unit, a first cover member, and a second cover member.

The main body member includes a first passage portion and a second passage portion. The first passage portion has a first passage connected to the fluid circuit, and the first passage has a groove shape where one surface of the main body member is opened. The second passage portion has a second passage that communicates with the first passage at a plurality of places and connected to the fluid circuit. The second passage has a groove shape where another surface of the main body member is opened.

The drive unit drives valve body portions in conjunction adjusting a flow rate of a fluid passing through a communication passage that communicates the first passage and the second passage. The first cover member is attached to a surface of the first passage portion. The second cover member is attached to a surface of the second passage portion. The first passage portion, the second passage portion, and the drive unit are stacked and arranged in this order.

The first cover member includes: a sealing portion and an opening. The sealing portion is arranged to seal an opened portion of the first passage, when the first cover member is attached to the surface of the first passage portion. The opening is arranged along an outer edge of the opened portion of the first passage and is formed to communicate a side of the main body member to an external side.

According to the flow path switching device, the first passage portion, the second passage portion, and the drive unit are stacked and arranged in this order, so that it is possible to switch the passage configuration of the fluid circuit by a compact configuration.

Since the first cover member has the sealing portion and the opening, it is possible to easily locate a position where the fluid flowing through the first passage leaks from between the sealing portion of the first cover member and the first passage portion. Therefore, according to the flow path switching device, it is possible to improve workability in detecting leakage of the fluid and rejoining the sealing portion in a leak inspection, and it is possible to improve workability in manufacturing the flow path switching device.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A schematic configuration of a flow path switching device 1 according to a first embodiment will be described with reference to the drawings. As illustrated in FIG. 1, the flow path switching device 1 according to the first embodiment constitutes a part of a heat medium circuit 50 as a fluid circuit, and switches a passage configuration of the heat medium circuit 50, as described later.

The heat medium circuit 50 according to the first embodiment is mounted on an electric vehicle that obtains driving force for traveling from a motor generator. The heat medium circuit 50 is used in the electric vehicle when air-conditioning in the cabin of the vehicle, which is a space to be air-conditioned, is performed and when the temperatures of in-vehicle equipment (e.g., heat generating equipment 54 and a battery 57), which are objects whose temperatures are to be adjusted, are adjusted. That is, the heat medium circuit 50 according to the first embodiment constitutes, in an electric vehicle, a part of a vehicle air conditioner with a temperature adjustment function for the in-vehicle equipment.

In the heat medium circuit 50 of the first embodiment, the heat generating equipment 54 that generates heat during operation and the battery 57 that generates heat during charging and discharging are objects whose temperatures are to be adjusted. The heat generating equipment 54 includes a plurality of components. Specific examples of the components of the heat generating equipment 54 include a motor generator, a power control unit (so-called PCU), and a control device for an advanced driving assistance system (so-called ADAS).

The motor generator outputs driving force for traveling by being supplied with power, and generates regenerative power when the vehicle decelerates or the like. The PCU is obtained by integrating a transformer, a frequency converter, and the like in order to appropriately control the power to be supplied to each in-vehicle equipment.

The battery 57 is a secondary battery (e.g., a lithium ion battery) that stores the power to be supplied to the motor generator and the like. The battery 57 is an assembled battery formed by connecting a plurality of battery cells in series or in parallel.

As illustrated in FIG. 1, the components of the heat medium circuit 50 are connected to the flow path switching device 1 according to the first embodiment. Specifically, a heater core 51, a heat medium-refrigerant heat exchanger 52, a heating device 53, the heat generating equipment 54, a radiator 55, a chiller 56, the battery 57, a first heat medium pump 58a, and a second heat medium pump 58b are connected to the flow path switching device 1 via heat medium pipes.

Figure 2:
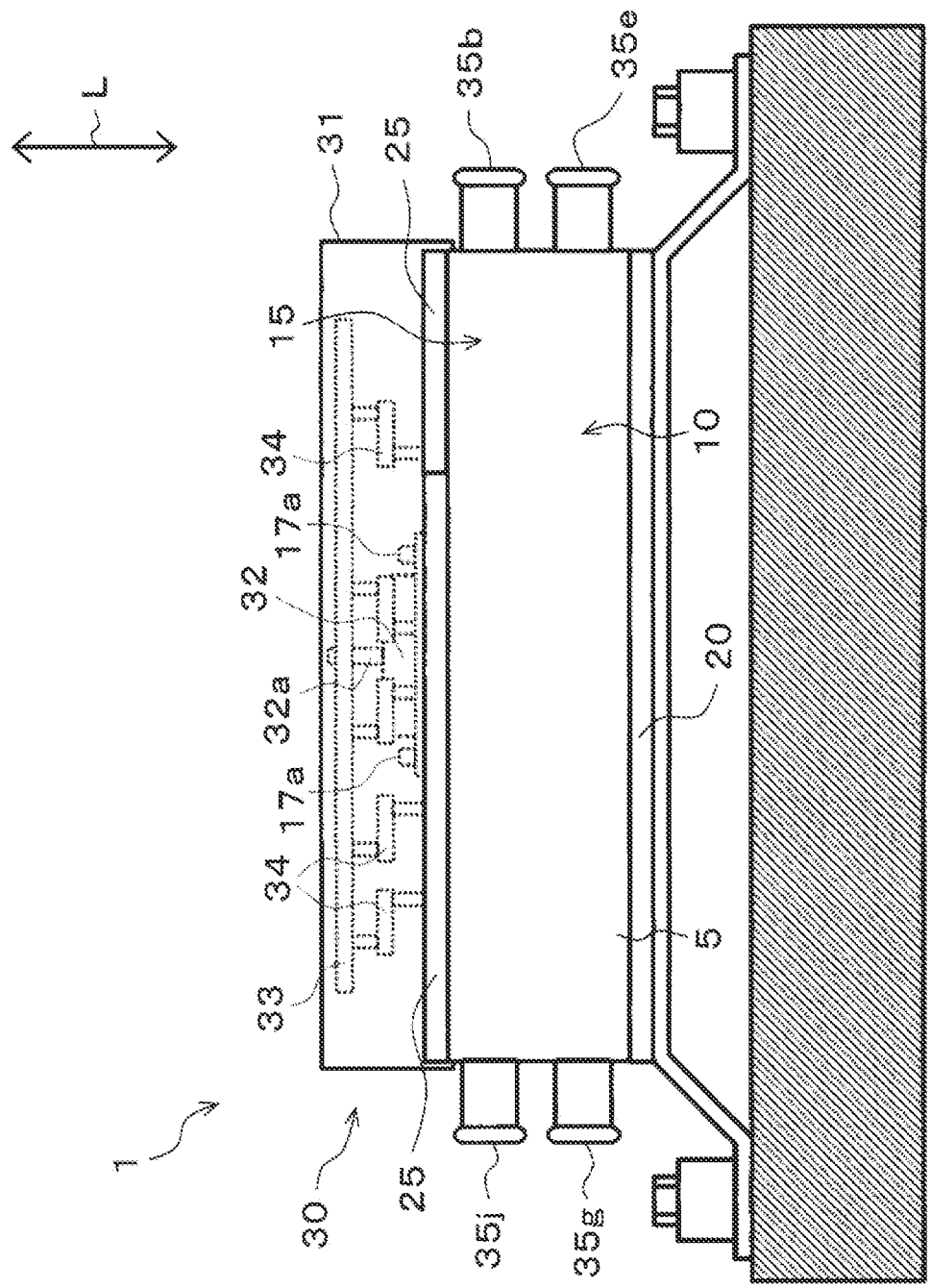
FIG. 2 is a side view of the flow path switching device according to the first embodiment.

As illustrated in FIG. 2, the flow path switching device 1 includes a first cover member 20, a main body member 5, a second cover member 25, and a drive unit 30. In the flow path switching device 1, the first cover member 20, the main body member 5, the second cover member 25, and the drive unit 30 are stacked and arranged in this order in a stacking direction L.

In the flow path switching device 1 according to the first embodiment, the main body member 5 is formed in a block shape having a rectangular parallelepiped shape by a synthetic resin, as illustrated in FIGS. 1 and 2. On one surface (lower surface in FIG. 2) side of the main body member 5, a first passage 11, having a groove shape, the one surface side of which is opened, is formed.

Figure 4:
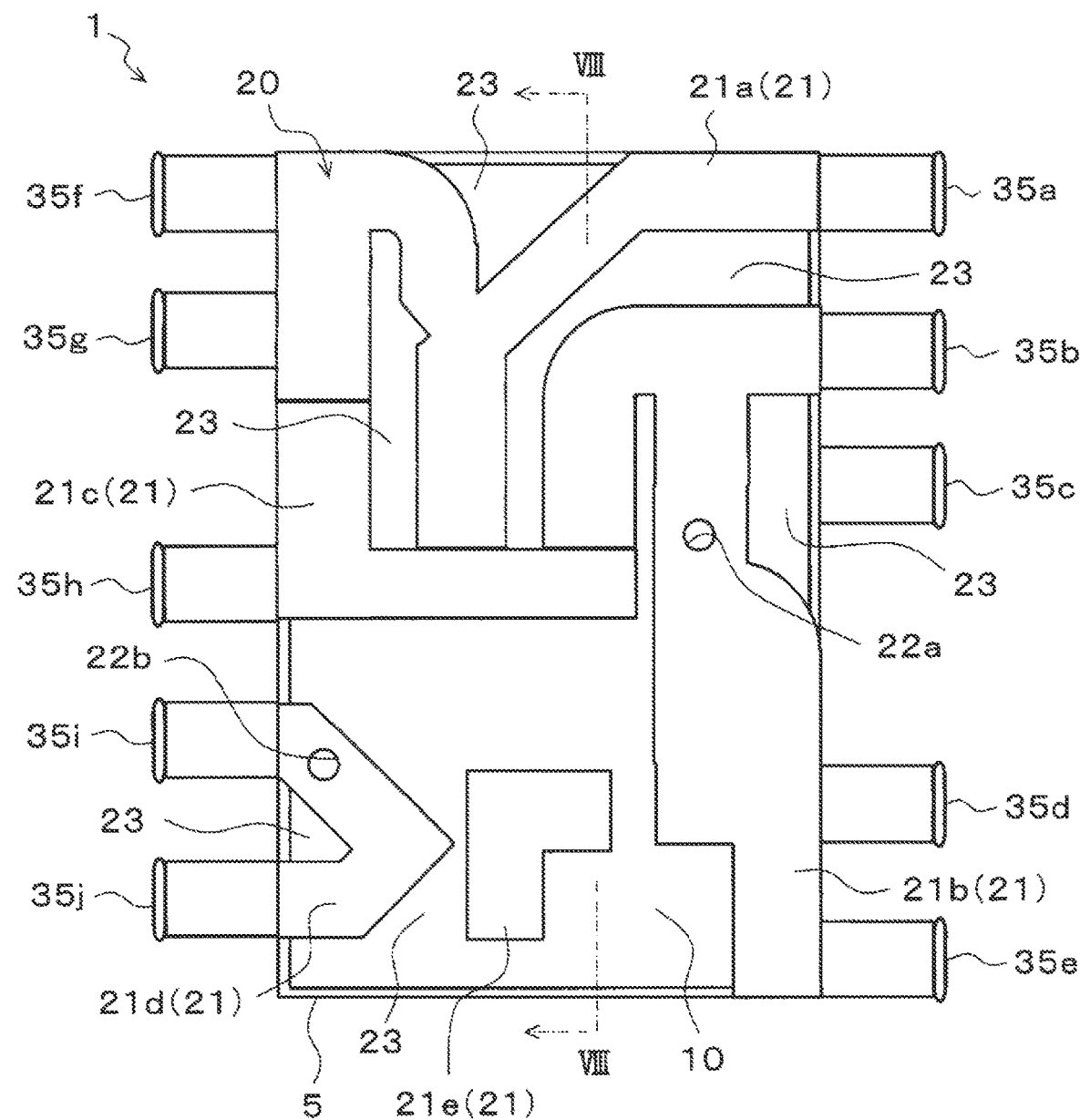
FIG. 4 is a plan view of a first passage portion of the flow path switching device.
Figure 8:
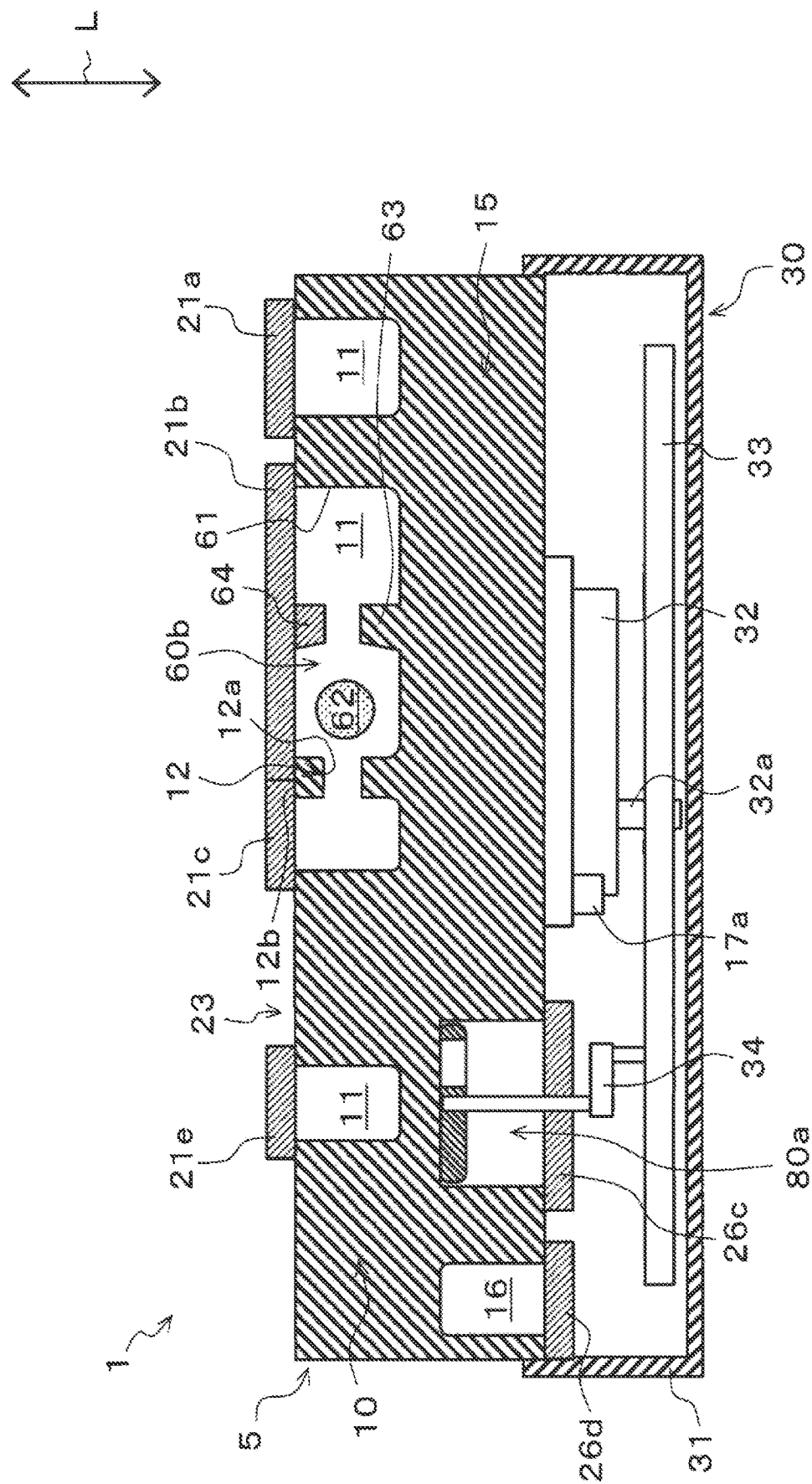
FIG. 8 is a cross-sectional view taken along a line VIII-VIII in FIGS. 4 and 6.

As illustrated in FIGS. 2, 4, 8, and the like, the first passage 11 functions as a pipeline through which a heat medium in the heat medium circuit 50 circulates by joining the first cover member 20 to the one surface of the main body member 5. The one surface side of the main body member 5 constitutes a first passage portion 10.

On another surface (upper surface in FIG. 2) side positioned on the back side of the one surface of the main body member 5, a second passage 16 having a groove shape, the another surface side of which is opened, is formed. As illustrated in FIGS. 2 and 8, the second passage 16 functions as a heat medium passage through which the heat medium in the heat medium circuit 50 circulates by joining the second cover member 25 and the like to the other surface of the main body member 5. The other surface side of the main body member 5 constitutes a second passage portion 15.

A plurality of valve body portions 73 are arranged inside the second passage 16. In the first embodiment, the valve body portions 73 of a first heat medium three-way valve 70a to a third heat medium three-way valve 70c, a first heat medium on-off valve 80a, and a second heat medium on-off valve 80b, which will be described later, are arranged inside the second passage 16. Each of the valve body portions 73 switches the flows of the heat medium in the first passage 11 and the second passage 16, thereby changing the passage configuration of the heat medium circuit 50.

In the main body member 5, communication portions 13 formed to penetrate the one surface side and the other surface side are formed at a plurality of predetermined places. The communication portions connect between the first passage 11 and the second passage 16 such that the heat medium can circulate therebetween, and include a first communication portion 13a, a second communication portion 13b, and a third communication portion 13c, which will be described later.

As illustrated in FIG. 2, a plurality of connection ports, to which heat medium pipes of the heat medium circuit 50 are to be connected, are formed on the side surfaces of the main body member 5. The flow path switching device 1 according to the first embodiment has a first connection port 35a to a tenth connection port 35j, to which the components of the heat medium circuit 50 are connected via the heat medium pipes.

As illustrated in FIGS. 2 and 4, the first cover member 20 is attached to the surface of the first passage portion 10 of the main body member 5, and has a plurality of sealing portions 21 formed in plate shapes by a synthetic resin, and an opening 23. The first cover member 20 according to the first embodiment has a first sealing portion 21a to a fifth sealing portion 21e. Each of the sealing portions 21 of the first cover member 20 is joined to one surface of the main body member 5 (lower surface, in FIG. 2, of the main body member 5) by vibration welding, laser welding, or the like.

As a result, the opened portion of the first passage 11 having a groove shape is sealed by the sealing portions 21 of the first cover member 20, so that the first passage 11 functions as a pipeline through which the heat medium circulates. The outer edge of each of the sealing portions 21 is positioned, on the surface of the first passage portion 10, outside the first passage 11 along the outer edge of the opened portion of the first passage 11.

The opening 23 of the first cover member 20 passes through the first cover member 20 in the thickness direction and is formed to communicate the side of the main body member 5 to the outside of the flow path switching device 1. Since the opening 23 is arranged along the outer edge of each of the sealing portions 21 of the first cover member 20, the opening is arranged at a position along the outer edge of the opened portion of the first passage 11.

Figure 6:
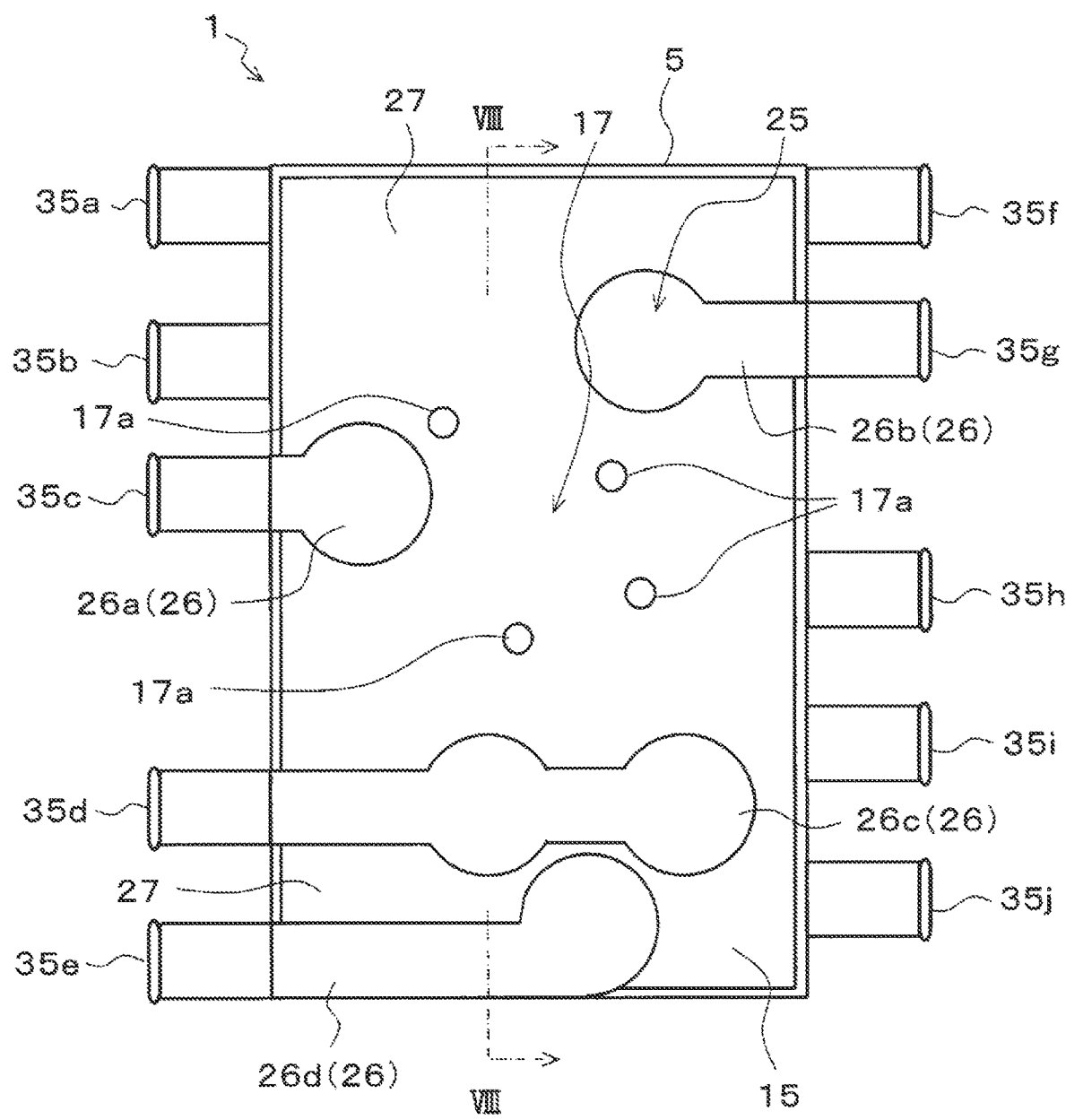
FIG. 6 is a plan view of a second passage portion of the flow path switching device.

As illustrated in FIGS. 2 and 6, the second cover member 25 is attached to the surface of the second passage portion 15 of the main body member 5, and has a plurality of sealing portions 26 formed in plate shapes by a synthetic resin, and an opening 27. The second cover member 25 according to the first embodiment has a first sealing portion 26a to a fourth sealing portion 26d. Each of the sealing portions 26 of the second cover member 25 is joined to the other surface of the main body member 5 (lower surface, in FIG. 2, of the main body member 5) by vibration welding, laser welding, or the like.

As a result, the opened portion of the second passage 16 having a groove shape is sealed by the sealing portions 26 of the second cover member 25, so that the second passage 16 functions as a pipeline through which the heat medium circulates. The outer edge of each of the sealing portions 26 is positioned, on the surface of the second passage portion 15, outside the second passage portion 15 along the outer edge of the opened portion of the second passage portion 15.

The opening 27 of the second cover member 25 penetrates the second cover member 25 in the thickness direction and is formed to communicate the side of the main body member 5 and the outside of the flow path switching device 1. Since the opening 27 is arranged along the outer edge of each of the sealing portions 26 of the second cover member 25, the opening is arranged at a position along the outer edge of the opened portion of the second passage 16.

As illustrated in FIG. 2 and the like, the drive unit 30 is arranged on the other surface side of the main body member 5 having a block shape (i.e., on the surface side of the second passage portion 15). The drive unit 30 is configured such that an electromagnetic motor 32, a link disc 33, link levers 34, and a non-illustrated drive control unit are housed in a casing 31. The casing 31 protects the electromagnetic motor 32, the link disc 33, the link levers 34, and the drive control unit from dust and water.

The electromagnetic motor 32 has a drive shaft 32a driven by power supply, and functions as a drive source for the valve body portions 73 of the first heat medium three-way valve 70a to the third heat medium three-way valve 70c, the first heat medium on-off valve 80a, and the second heat medium on-off valve 80b, which will be described later. Inside the casing 31 of the drive unit 30, the electromagnetic motor 32 is attached to a motor holder 17 formed on the surface of the second passage portion 15 so as to be located at a predetermined position.

The link disc 33 and the link levers 34 constitute a transmission mechanism for transmitting the driving force generated by the electromagnetic motor 32 to the respective valve body portions 73.

The link disc 33 is a disc-shaped member that is attached to the drive shaft 32a of the electromagnetic motor 32 and is arranged inside the casing 31. The link levers 34 are rotatably attached to the link disc 33 so as to correspond to the valve body portions 73. One end of each of the link levers 34 is attached to a rotating shaft 74a of each of the valve body portions 73.

Therefore, when the driving force by the electromagnetic motor 32 is transmitted to the link disc 33 and the link disc rotates, each of the link levers 34 can be rotated, and each of the valve body portions 73 can be rotated around the rotating shaft 74a. As a result, the drive unit 30 can operate in conjunction the valve body portions 73 disposed in the flow path switching device 1.

The drive control unit is an electronic control unit for controlling the operation of the flow path switching device 1. Specifically, the drive control unit has a microcontroller, and controls the operations of the electromagnetic motor 32 and the transmission mechanism in accordance with control signals from a non-illustrated control device.

Next, configurations of the first passage 11 and the second passage 16 in the first embodiment will be described with reference to FIGS. 3 to 7. As described above, the heat medium circuit 50 is a heat medium circulation circuit that circulates cooling water as the heat medium. In the first embodiment, the passage configuration of the heat medium circuit 50 is switched as described later in order to perform air-conditioning in the cabin of the vehicle and temperature adjustment of the in-vehicle equipment (the heat generating equipment 54 and the battery 57). As the heat medium circulating in the heat medium circuit 50, an ethylene glycol aqueous solution, which is an incompressible fluid, is adopted.

As illustrated in FIG. 1 and the like, the inlet of a heat medium passage 52b of the heat medium-refrigerant heat exchanger 52 is connected to the first connection port 35a via the heat medium pipe. Here, the heat medium-refrigerant heat exchanger 52 is a component of the heat medium circuit 50, and is one of the components of a refrigeration cycle 100. The heat medium-refrigerant heat exchanger 52 includes a refrigerant passage 52a through which the refrigerant in the refrigeration cycle 100 circulates, and the heat medium passage 52b through which the heat medium in the heat medium circuit 50 circulates.

The heat medium-refrigerant heat exchanger 52 is formed of the same type of metal (in the first embodiment, an aluminum alloy) having an excellent heat transfer property, and the respective constituent members are integrated by brazing. As a result, the refrigerant circulating through the refrigerant passage 52a and the heat medium circulating through the heat medium passage 52b can exchange heat with each other.

In the first embodiment, the high-pressure refrigerant in the refrigeration cycle 100 circulates through the refrigerant passage 52a of the heat medium-refrigerant heat exchanger 52, so that the heat medium-refrigerant heat exchanger 52 functions as a radiator that dissipates heat of the high-pressure refrigerant to the heat medium in the heat medium passage 52b. As a result, the heat medium-refrigerant heat exchanger 52 can heat the heat medium with the heat of the high-pressure refrigerant.

The heating device 53 is connected to the outlet of the heat medium passage 52b of the heat medium-refrigerant heat exchanger 52 via the heat medium pipe. The heating device 53 has a heating passage and a heat generator, and heats the heat medium flowing into the heater core 51 by the power supplied from a non-illustrated control device. The calorific value of the heating device 53 can be arbitrarily adjusted by controlling the power from the control device.

The heating passage of the heating device 53 is a passage through which the heat medium circulates. The heat generator heats the heat medium circulating through the heating passage by being supplied with power. Specifically, a PTC element or a nichrome wire can be adopted as the heat generator.

The heat medium inlet side of the heater core 51 is connected to the outlet side of the heating passage of the heating device 53 via the heat medium pipe. The heater core 51 is a heat exchanger that exchanges heat between blown air blown from a non-illustrated cabin blower and the heat medium. Therefore, the heater core 51 can heat the blown air by using, as a heat source, the heat of the heat medium heated by the heat medium-refrigerant heat exchanger 52, the heating device 53, or the like.

Figure 7:
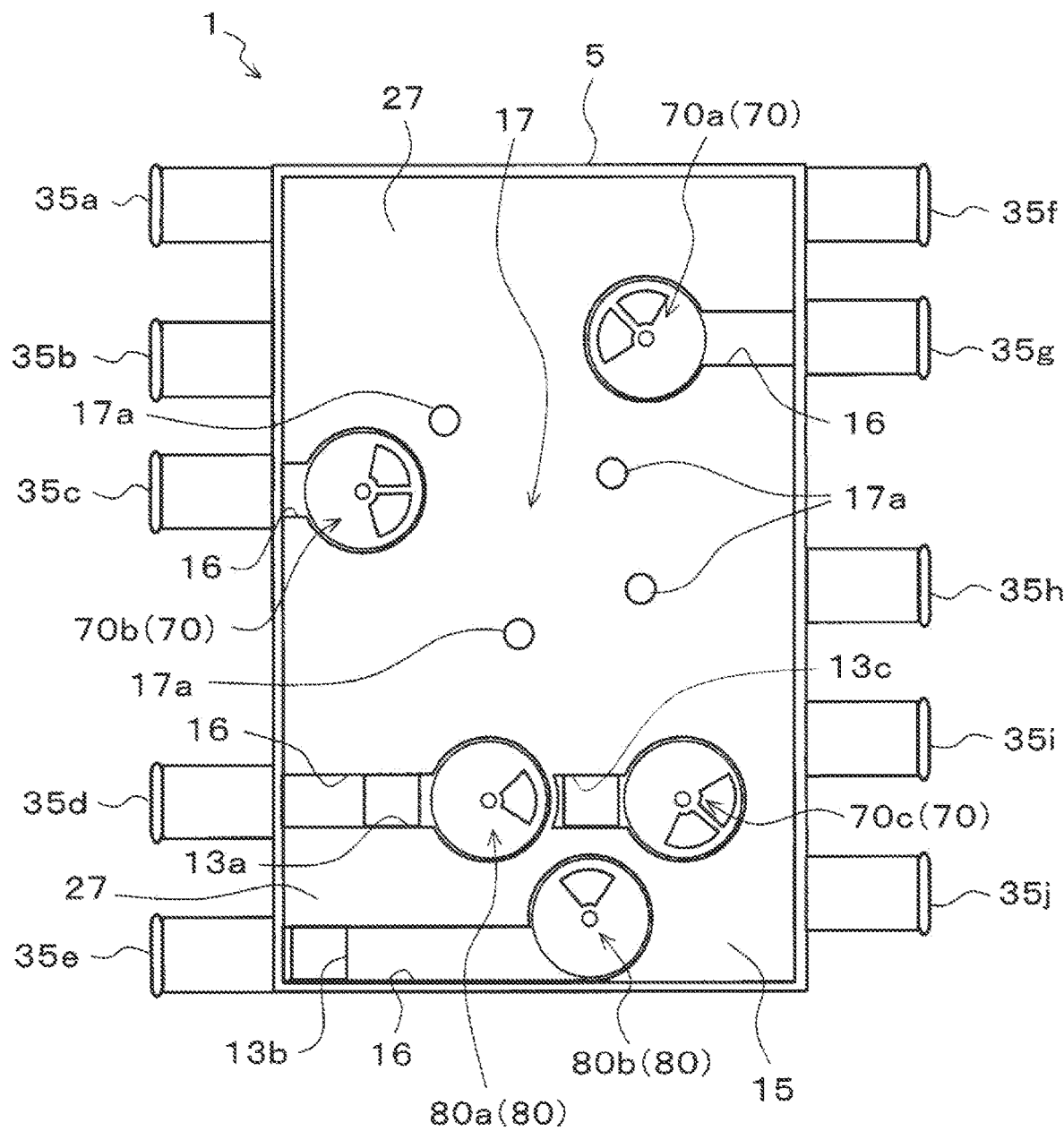
FIG. 7 is a plan view of a configuration of a second passage of the flow path switching device.

The heater core 51 is arranged on the downstream side of a cabin evaporator constituting the refrigeration cycle 100 in the casing of a cabin air-conditioning unit mounted on the electric vehicle. Heating of and dehumidification and heating of the cabin of the electric vehicle can be realized by heating the blown air by the heater core 51. The third connection port 35c is connected to the heat medium outlet side of the heater core 51 via the heat medium pipe. As illustrated in FIG. 7, the third connection port 35c constitutes one end portion of the second passage 16.

A heat medium passage 54a of the heat generating equipment 54 is connected to the third connection port 35c constituting one end portion of the first passage 11 via the heat medium pipe. The heat medium passage 54a of the heat generating equipment 54 is formed in a housing portion, a case, or the like forming an outer shell of the heat generating equipment 54.

The heat medium passage 54a of the heat generating equipment 54 is a heat medium passage for adjusting the temperature of the heat generating equipment 54 by circulating the heat medium. In other words, the heat medium passage 54a of the heat generating equipment 54 functions as a temperature adjusting unit that adjusts the temperature of the heat generating equipment 54 by heat exchange with the heat medium circulating in the heat medium circuit 50.

The fourth connection port 35d is connected to the other end side of the heat medium passage 54a of the heat generating equipment 54 via the heat medium pipe. As illustrated in FIG. 7, the fourth connection port 35d constitutes the one end portion of the second passage 16.

The outlet of the heat medium passage 57a of the battery 57 is connected to the fifth connection port 35e constituting the one end portion of the second passage 16 via the heat medium pipe. The battery 57 is a secondary battery (e.g., a lithium ion battery) that stores the power to be supplied to the motor generator and the like. The battery 57 is an assembled battery formed by connecting a plurality of battery cells in series or in parallel.

The heat medium passage 57a of the battery 57 is a heat medium passage for adjusting the temperature of the battery 57 by circulating the heat medium, and constitutes a heat exchanger unit for equipment. That is, the heat medium passage 57a of the battery 57 is connected such that the heat medium in the heat medium circuit 50 can flow in and out. The outlet of a heat medium passage 56b of the chiller 56 is connected to the inlet of the heat medium passage 57a of the battery 57 via the heat medium pipe.

The chiller 56 includes a heat medium-refrigerant heat exchanger, and includes a refrigerant passage 56a through which the low-pressure refrigerant in the refrigeration cycle 100 passes, and the heat medium passage 56b through which the heat medium circulating in the heat medium circuit 50 passes. The chiller 56 functions as a heat absorber that causes the low-pressure refrigerant to absorb the heat of the heat medium circulating through the heat medium passage 52b, and can cool the heat medium passing through the heat medium passage 56b.

Figure 5:
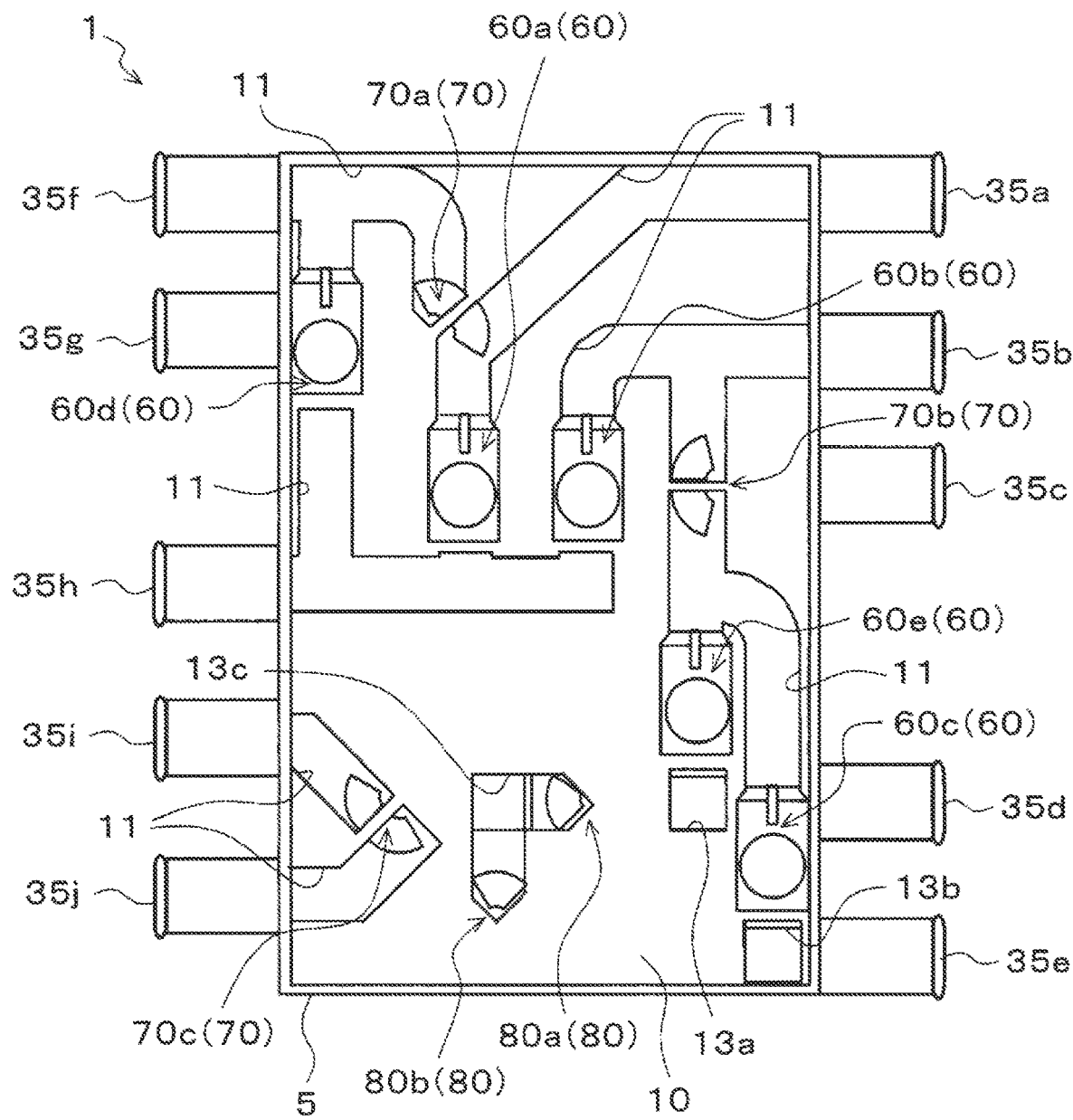
FIG. 5 is a plan view of a configuration of a first passage of the flow path switching device.

The sixth connection port 35f is connected to the inlet of the heat medium passage 56b of the chiller 56 via the heat medium pipe. As illustrated in FIG. 5, the sixth connection port 35f constitutes the one end portion of the first passage 11.

The discharge port of the second heat medium pump 58b is connected to the seventh connection port 35g constituting the one end portion of the second passage 16 via the heat medium pipe. The second heat medium pump 58b is an electric pump whose rotation speed (i.e., pumping capability) is controlled by a control voltage output from a non-illustrated control device. Therefore, the second heat medium pump 58b pumps the heat medium toward the seventh connection port 35g. The suction port of the second heat medium pump 58b is connected to the outlet of a second reserve tank 59b via the heat medium pipe.

The second reserve tank 59b is one of heat medium storage portions that stores the heat medium surplus in the heat medium circuit 50. In the case of a passage configuration through the second heat medium pump 58b, the second reserve tank 59b suppresses a decrease in the liquid amount of the heat medium circulating in the heat medium circuit 50. The second reserve tank 59b has a heat medium supply port for supplying the heat medium if the amount of the heat medium in the heat medium circuit 50 becomes insufficient.

A second attachment port 22b formed in the first cover member 20 is connected to the inlet of the second reserve tank 59b via a second hose member 36b having flexibility. The second attachment port 22b is formed in the first cover member 20 and communicates with the first passage 11. Therefore, the heat medium flowing through the first passage 11 is supplied to the second reserve tank 59b via the second hose member 36b.

The discharge port of the first heat medium pump 58a is connected to an eighth connection portion 90h constituting the one end portion of the first passage 11 via the heat medium pipe. The first heat medium pump 58a is an electric pump similar to the second heat medium pump 58b described above. Therefore, the first heat medium pump 58a pumps the heat medium toward the eighth connection port 35h. The suction port of the first heat medium pump 58a is connected to the outlet of the first reserve tank 59a via the heat medium pipe.

The first reserve tank 59a is one of the heat medium storage portions to store the heat medium surplus in the heat medium circuit 50. The first reserve tank 59a suppresses a decrease in the liquid amount of the heat medium circulating in the heat medium circuit 50, in the case of a passage configuration through the first heat medium pump 58a. The first reserve tank 59a and the second reserve tank 59b are selectively used depending on the passage configuration of the heat medium circuit 50. The first reserve tank 59a has a heat medium supply port for replenishing the heat medium if the amount of the heat medium in the heat medium circuit 50 becomes insufficient.

A first attachment port 22a formed in the first cover member 20 is connected to the inlet of the first reserve tank 59a via a first hose member 36a having flexibility. The first attachment port 22a is formed in the first cover member 20 and communicates with the first passage 11. Therefore, the heat medium flowing through the first passage 11 is supplied to the first reserve tank 59a via the first hose member 36a.

The outlet of the radiator 55 is connected to the ninth connection port 35i constituting the one end portion of the first passage 11 via the heat medium pipe. The radiator 55 is a heat exchanger that exchanges heat between the heat medium circulating inside and outside air. Therefore, the radiator 55 dissipates the heat of the heat medium passing through the inside to the outside air.

The radiator 55 is arranged on the front side of the room of a drive device in the electric vehicle. Therefore, the radiator 55 can also be configured integrally with an outdoor heat exchanger. The tenth connection port 35j is connected to the inlet of the radiator 55 via the heat medium pipe. As illustrated in FIG. 5, the tenth connection port 35j constitutes the one end portion of the first passage 11.

Figure 3:
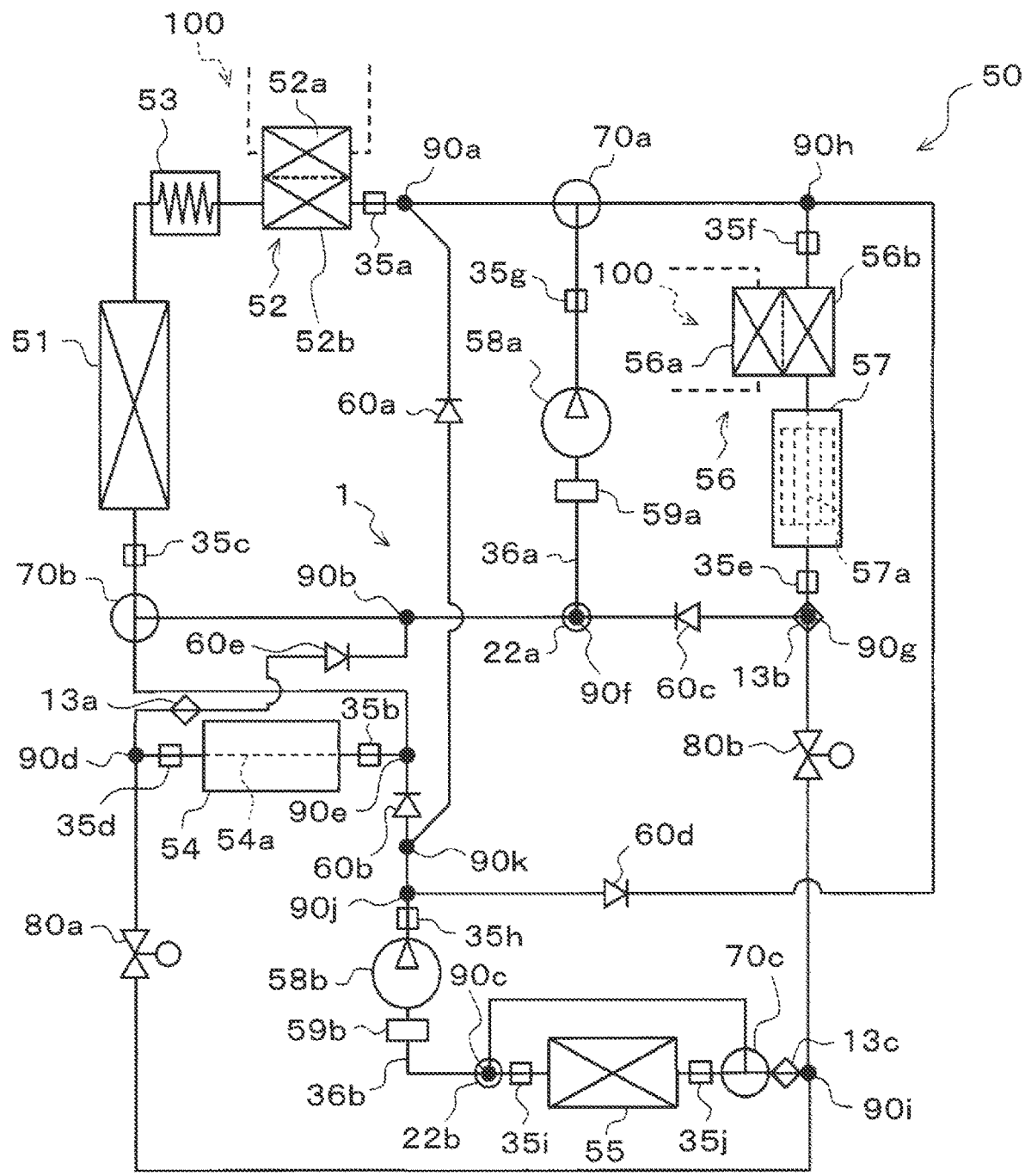
FIG. 3 is an overall configuration view of a heat medium circuit according to the first embodiment.

As illustrated in FIGS. 3 and 4, the first passage 11 extending from the first connection port 35a constitutes a first connection portion 90a connected to the first passage 11 extending from one of the outlets of the first heat medium three-way valve 70a and to the first passage 11 extending from the outlet of a first heat medium check valve 60a. The first heat medium check valve 60a allows the heat medium to flow from the side of an eleventh connection portion 90k to be described later to the side of the first connection portion 90a, and prohibits the heat medium from flowing from the first connection portion 90a to the eleventh connection portion 90k.

The first passage 11 extending from the sixth connection port 35f constitutes the eighth connection portion 90h connected to the first passage 11 extending from the other of the outlets of the first heat medium three-way valve 70a and to the first passage 11 extending from the outlet of a fourth heat medium check valve 60d. The fourth heat medium check valve 60d allows the heat medium to flow from the side of a tenth connection portion 90j to be described later to the side of the eighth connection portion 90h, and prohibits the heat medium from flowing from the eighth connection portion 90h to the tenth connection portion 90j.

As illustrated in FIGS. 3 and 7, the second passage 16 extending from the seventh connection port 35g is connected to the inlet of the first heat medium three-way valve 70a. Therefore, the first heat medium three-way valve 70a is a three-way flow control valve capable of adjusting a flow rate ratio between the flow rate of, of the heat medium discharged from the first heat medium pump 58a, the heat medium flowing out of one of the outlets and the flow rate of the heat medium flowing out of the other of the outlets. The operation of the first heat medium three-way valve 70a is controlled by controlling the drive unit 30 by a non-illustrated control device.

Furthermore, the first heat medium three-way valve 70a can cause the total flow rate of the heat medium discharged from the first heat medium pump 58a to flow out to either of the two outlets. As a result, the first heat medium three-way valve 70a can switch the passage configuration of the heat medium circuit 50.

The heat medium flowing in from the inlet of the first heat medium three-way valve 70a passes through a communication passage in the course of flowing through the first heat medium three-way valve 70a toward the outlet, and flows out from the second passage 16 to the first passage 11. Specific configurations of heat medium three-way valves 70 including the first heat medium three-way valve 70a will be described later with reference to the drawings.

As illustrated in FIGS. 3 and 7, the second passage 16 extending from the third connection port 35c is connected to the inlet of a second heat medium three-way valve 70b. Therefore, the second heat medium three-way valve 70b can adjust a flow rate ratio between the flow rate of, of the heat medium flowing out of the heater core 51, the heat medium flowing out of one of the outlets and the flow rate of the heat medium flowing out of the other of the outlets.

Furthermore, the second heat medium three-way valve 70b can cause the total flow rate of the heat medium flowing out of the heater core 51 to flow out to either of the two outlets. As a result, the second heat medium three-way valve 70b can switch the passage configuration of the heat medium circuit 50.

The heat medium flowing in from the inlet of the second heat medium three-way valve 70b passes through a communication passage in the course of flowing through the second heat medium three-way valve 70b toward the outlet, and flows out from the second passage 16 to the first passage 11.

As illustrated in FIGS. 3 and 5, the first passage 11 extending from the second connection port 35b constitutes a fifth connection portion 90e connected to the first passage 11 extending from the outlet of a second heat medium check valve 60b and to the first passage 11 extending from one of the outlets of the second heat medium three-way valve 70b. The second heat medium check valve 60b allows the heat medium to flow from the side of the eleventh connection portion 90k to be described later to the side of the fifth connection portion 90e, and prohibits the heat medium from flowing from the fifth connection portion 90e to the eleventh connection portion 90k.

Here, the first passage 11 extending from the other of the outlets of the second heat medium three-way valve 70b constitutes a second connection portion 90b connected to the first passage 11 extending from the outlet of a third heat medium check valve 60c and to the first passage 11 extending from the outlet of a fifth heat medium check valve 60e. The third heat medium check valve 60c allows the heat medium to flow from the side of a seventh connection portion 90g to the side of a sixth connection portion 90f, and prohibits the heat medium from flowing from the sixth connection portion 90f to the seventh connection portion 90g.

As illustrated in FIG. 4, the opened portion of the first passage 11 including the second connection portion 90b is sealed by the second sealing portion 21b of the first cover member 20. In the second sealing portion 21b, the first attachment port 22a, penetrating, in the thickness direction, the second sealing portion 21b having a plate shape, is formed.

One end portion of the first hose member 36a, formed of a flexible hose or the like, is connected to the first attachment port 22a. As described above, the other end portion of the first hose member 36a is connected to the inlet of the first reserve tank 59a. As a result, the heat medium flowing through the first passage 11 is supplied to the first reserve tank 59a via the first hose member 36a.

As illustrated in FIG. 3, the first hose member 36a is connected, at the first attachment port 22a, to the first passage 11 extending from the other of the outlets of the second heat medium three-way valve 70b and to the first passage 11 extending from the outlet of the third heat medium check valve 60c. Therefore, the first attachment port 22a constitutes the sixth connection portion 90f.

As illustrated in FIG. 7, the second passage 16 extending from the fourth connection port 35d is connected to the second passage 16 extending from one of the inflow outlets of the first heat medium on-off valve 80a, and has the first communication portion 13a. Here, the communication portion 13 including the first communication portion 13a is an opening that communicates between the first passage 11 and the second passage 16 such that the heat medium can flow in and out. As illustrated in FIG. 5, the first passage 11, in which the first communication portion 13a is formed, extends from the inlet of the fifth heat medium check valve 60e.

That is, the second passage 16 extending from the fourth connection port 35d constitutes a fourth connection portion 90d connected to the second passage 16 extending from one of the inflow outlets of the first heat medium on-off valve 80a and to the second passage 16 extending from the first communication portion 13a. The fifth heat medium check valve 60e allows the heat medium to flow from the side of the fourth connection portion 90d to the side of the second connection portion 90b to be described later, and prohibits the heat medium from flowing from the second connection portion 90b to the fourth connection portion 90d.

The first heat medium on-off valve 80a has a communication passage that communicates the first passage 11 and the second passage 16, and opens and closes the communication passage by the operations of the valve body portions 73 to control the flow of the heat medium from one of the inflow outlets to the other. Therefore, the heat medium flowing in from one of the inflow outlets of the first heat medium on-off valve 80a passes through the communication passage in the course of flowing through the first heat medium on-off valve 80a toward the other of the inflow outlets, and flows out from the second passage 16 to the first passage 11.

As illustrated in FIG. 5, the first passage 11 extending from the other of the inflow outlets of the first heat medium on-off valve 80a is connected to the first passage 11 extending from the other of the inflow outlets of the second heat medium on-off valve 80b, and has the third communication portion 13c.

As illustrated in FIGS. 3 and 7, the second passage 16 extending from the fifth connection port 35e is connected to the second passage 16 extending from one of the inflow outlets of the second heat medium on-off valve 80b, and has the second communication portion 13b. As illustrated in FIG. 5, the first passage 11, in which the second communication portion 13b is formed, extends from the inlet of the third heat medium check valve 60c.

That is, the second passage 16 extending from the fifth connection port 35e constitutes the seventh connection portion 90g connected to the second passage 16 extending from one of the inflow outlets of the second heat medium on-off valve 80b and to the second passage 16 extending from the second communication portion 13b.

The first passage 11 extending from the eighth connection port 35h is connected to the first passage 11 extending from the inlet of the second heat medium check valve 60b and to the other first passage 11 to constitute the tenth connection portion 90j and the eleventh connection portion 90k.

Specifically, the tenth connection portion 90j includes the first passage 11 extending from the eighth connection port 35h, the first passage 11 extending from the inlet of the second heat medium check valve 60b, and the first passage 11 extending from the inlet of the fourth heat medium check valve 60d.

The eleventh connection portion 90k includes the first passage 11 extending from the eighth connection port 35h, the first passage 11 extending from the inlet of the second heat medium check valve 60b, and the first passage 11 extending from the inlet of the first heat medium check valve 60a.

As illustrated in FIGS. 3 and 5, the first passage 11 extending from the ninth connection port 35i is connected to the first passage 11 extending from one of the outlets of the third heat medium three-way valve 70c. The first passage 11 extending from the tenth connection port 35j is connected to the first passage 11 extending from the other of the outlets of the third heat medium three-way valve 70c.

As illustrated in FIG. 4, the opened portions of the first passage 11 extending from the ninth connection port 35i and the first passage 11 extending from the tenth connection port 35j are sealed by the fourth sealing portion 21d of the first cover member 20. The second attachment port 22b, penetrating, in the thickness direction, the fourth sealing portion 21d having a plate shape, is formed in a portion of the fourth sealing portion 21d that corresponds to the first passage 11 extending from the ninth connection port 35i.

One end portion of the second hose member 36b, formed of a flexible hose or the like, is connected to the second attachment port 22b. As described above, the other end portion of the second hose member 36b is connected to the inlet of the second reserve tank 59b.

That is, the second hose member 36b is connected, at the second attachment port 22b, to the first passage 11 extending from the ninth connection port 35i and to the first passage 11 extending from one of the outlets of the third heat medium three-way valve 70c, as illustrated in FIG. 3. Therefore, the second attachment port 22b constitutes a third connection portion 90c.

As illustrated in FIGS. 3 and 7, the third communication portion 13c is formed in the second passage 16 extending from the inlet of the third heat medium three-way valve 70c. Similarly to the first communication portion 13a and the like described above, the third communication portion 13c communicates the first passage 11 and the second passage 16. Therefore, on the side of the first passage portion 10, the first passage 11 extending from the third communication portion 13c extends. The first passage 11 extending from the third communication portion 13c constitutes a ninth connection portion 90i connected to the first passage 11 extending from the other of the inflow outlets of the first heat medium on-off valve 80a and to the first passage 11 extending from the other of the inflow outlets of the second heat medium on-off valve 80b.

Specific configurations of heat medium check valves 60, including the first heat medium check valve 60a to the fifth heat medium check valve 60e, and of the heat medium three-way valves 70, including the first heat medium three-way valve 70a to the third heat medium three-way valve 70c, will be described later with reference to the drawings. The same applies to heat medium on-off valves 80 including the first heat medium on-off valve 80a to the second heat medium on-off valve 80b.

According to the flow path switching device 1 of the first embodiment, the passage configuration of the heat medium circuit 50 can be switched to various aspects by controlling the operations of the heat medium three-way valves 70 and of the heat medium on-off valves 80.

For example, the flow path switching device 1 causes, in the heat medium circuit 50, the heat medium to circulate through the first heat medium pump 58a, the first heat medium three-way valve 70a, the heat medium-refrigerant heat exchanger 52, the heating device 53, and the heater core 51 in this order. Then, the heat medium flowing out of the heater core 51 is caused to flow and circulate to the second heat medium three-way valve 70b, the heat generating equipment 54, the fifth heat medium check valve 60e, the first reserve tank 59a, and the first heat medium pump 58a.

According to the heat medium circuit 50 having this passage configuration, the heat medium heated by waste heat from the heat generating equipment 54 can be caused to flow into the heater core 51, so that heating of the cabin of the vehicle using the waste heat from the heat generating equipment 54 can be realized.

In addition, the flow path switching device 1 causes, in the heat medium circuit 50, the heat medium to flow through the second heat medium pump 58b, the first heat medium check valve 60a, the heat medium-refrigerant heat exchanger 52, the heating device 53, the heater core 51, the second heat medium three-way valve 70b, and the heat generating equipment 54 in this order. Then, the heat medium flowing out of the heat generating equipment 54 is caused to flow through the first heat medium on-off valve 80a, the third heat medium three-way valve 70c, the radiator 55, the second reserve tank 59b, and the second heat medium pump 58b in this order, thereby circulating the heat medium.

As a result, a circulation route for the heat medium that passes through the heat generating equipment 54, the heat medium-refrigerant heat exchanger 52, the heater core 51, and the radiator 55 is formed. It is possible to realize heating of the cabin of the vehicle using the heat of the high-pressure refrigerant in the refrigeration cycle 100 or exhaust heat from the heat generating equipment 54. In addition, the radiator 55 can dissipate excess heat from the heat medium to the outside air, so that temperature adjustment in the heating can also be performed.

At this time, the flow path switching device 1 causes, in the heat medium circuit 50, the heat medium to flow and circulate through the first heat medium pump 58a, the first heat medium three-way valve 70a, the chiller 56, the battery 57, the third heat medium check valve 60c, the first reserve tank 59a, and the first heat medium pump 58a in this order.

As a result, the battery 57 can be cooled by using the heat medium cooled by the chiller 56. A circulation route for the heat medium that passes through the heat generating equipment 54, the heat medium-refrigerant heat exchanger 52, and the heater core 51 and a circulation route for the heat medium that passes through the chiller 56 and the battery 57 can be configured in parallel. Therefore, according to the heat medium circuit 50 having this passage configuration, it is possible to perform heating of the cabin of the vehicle using waste heat or the like from the heat generation equipment 54 and simultaneously to cool the battery 57 using the refrigeration cycle 100.

Furthermore, the flow path switching device 1 causes the heat medium to circulate through the second heat medium pump 58b, the fourth heat medium check valve 60d, the chiller 56, the battery 57, the second heat medium on-off valve 80b, the third heat medium three-way valve 70c, the radiator 55, the second reserve tank 59b, and the second heat medium pump 58b in this order. At the same time, the heat medium is caused to circulate through the second heat medium pump 58b, the heat generating equipment 54, the first heat medium on-off valve 80a, the third heat medium three-way valve 70c, the radiator 55, the second reserve tank 59b, and the second heat medium pump 58b in this order.

According to the heat medium circuit 50 having this configuration, a circulation route for the heat medium that passes through the chiller 56 and the battery 57 and a circulation route for the heat medium that circulates through the heat generating equipment 54 and the radiator 55 can be configured in parallel. As a result, the heat medium circuit 50 cools the battery 57 by the refrigeration cycle 100, and simultaneously can realize cooling of the heat generating equipment 54 by dissipating heat to the outside air.

Subsequently, a specific configuration of the first cover member 20 of the flow path switching device 1 according to the first embodiment will be described with reference to FIGS. 4, 5, and 8. As described above, the first cover member 20 is attached to the surface of the first passage portion 10 of the main body member 5 by vibration welding, laser welding, or the like. The first cover member 20 includes the sealing portions 21 for sealing the opened portion of the first passage 11 formed in a groove shape, and the opening 23.

As illustrated in FIG. 4, the first cover member 20 has the first sealing portion 21a to the fifth sealing portion 21e as the sealing portions 21. Each of the sealing portions 21 is attached, on the surface of the first passage portion 10, to seal the opened portion of the first passage 11.

Specifically, with reference to FIGS. 4 and 5, the first sealing portion 21a of the first cover member 20 is attached to seal the opened portions of the first passage 11 extending from the first connection port 35a and the first passage 11 extending from the sixth connection port 35f. The outer edge of the first sealing portion 21a is arranged along the outside of the opened portions of the first passage 11 extending from the first connection port 35a and the first passage 11 extending from the sixth connection port 35f.

A part of the outer edge of the first sealing portion 21a is arranged on a joint surface 12b formed on a reinforcing portion 12 of the first heat medium check valve 60a and the fourth heat medium check valve 60d. The configurations of the first heat medium check valve 60a and the like will be described later.

The second sealing portion 21b of the first cover member 20 is attached to seal the opened portions of the first passage 11 extending from the second connection port 35b and the first passage 11 extending from the other of the outlets of the second heat medium three-way valve 70b. The outer edge of the second sealing portion 21b is arranged along the outside of the opened portions of the first passage 11 extending from the second connection port 35b and the first passage 11 extending from the other of the outlets of the second heat medium three-way valve 70b. A part of the outer edge of the second sealing portion 21b is arranged on the joint surface 12b formed on the reinforcing portion 12 of the second heat medium check valve 60b.

As illustrated in FIGS. 4 and 5, the third sealing portion 21c of the first cover member 20 is attached to seal the opened portion of the first passage 11 extending from the eighth connection port 35h. The outer edge of the third sealing portion 21c is arranged along the outside of the opened portion of the first passage 11 extending from the eighth connection port 35h. A part of the outer edge of the third sealing portion 21c is arranged on a joint surface formed on the reinforcing portion 12 of the first heat medium check valve 60a, the second heat medium check valve 60b, and the fourth heat medium check valve 60d.

The fourth sealing portion 21d of the first cover member 20 is attached to seal the opened portions of the first passage 11 extending from the ninth connection port 35i and the first passage 11 extending from the tenth connection port 35j. The outer edge of the fourth sealing portion 21d is arranged along the outside of the opened portions of the first passage 11 extending from the ninth connection port 35i and the first passage 11 extending from the tenth connection port 35j.

The fifth sealing portion 21e of the first cover member 20 is attached to seal the opened portion of the first passage 11 extending from the third communication portion 13c. The outer edge of the fifth sealing portion 21e is arranged along the outside of the opened portion of the first passage 11 extending from the third communication portion 13c.

As a result, in the flow path switching device 1 according to the first embodiment, the opened portions of all of the first passages 11 formed in the first passage portion 10 are sealed by the sealing portions 21 of the first cover member 20. That is, in the flow path switching device 1, the first passages 11 formed in the first passage portion 10 can be configured as a tubular passage through which the heat medium circulates.

As illustrated in FIG. 8, the opening 23 penetrates in the thickness direction of the first cover member 20, and is opened to communicate the side of the main body member 5 and the external side of the flow path switching device 1.

As illustrated in FIG. 4, the opening 23 is arranged along the outer edge of the opened portion of each of the first passages 11. Therefore, in the first cover member 20, the first sealing portion 21a to the fifth sealing portion 21e are divided by the opening 23.

Here, when the flow path switching device 1 is manufactured, a leak inspection for detecting leakage of the heat medium from the first passage 11 is performed. When leakage of the heat medium from the first passage 11 is detected in the leak inspection, it is necessary, in order to ensure the airtightness of the first passage 11, to remove the first cover member 20 from the first passage portion 10 and to attach the first cover member again so as to ensure the airtightness.

For example, when the first cover member 20, having a plate shape that is of the same size as the surface of the first passage portion 10, is adopted, it has been difficult in the leak inspection to locate the position of leakage even if the leakage of the heat medium from between the first passage 11 and the first cover member 20 is detected. Since the position of the leakage cannot be located, it has been necessary to remove the entire first cover member 20 having a plate shape and to reattach it to the surface of the first passage portion 10.

In this regard, according to the flow path switching device 1 of the first embodiment, the first cover member 20 has the sealing portions 21 and the opening 23, so that, in the leak inspection, the position of the leakage of the heat medium from the inside of the first passage 11 can be located by using the opening 23. As a result, the work of reattaching the first cover member 20, which is performed to ensure the airtightness of the first passage 11, is reduced to the minimum necessary, and workability until the completion of the manufacturing can be improved.

In addition, in the first cover member 20 of the flow path switching device 1, the sealing portions 21 are divided by the opening 23, so that it is possible to locate the position of the leakage detected in the leak inspection at least in units of the sealing portions 21. As a result, it is possible to perform the work of reattaching the first cover member 20, accompanying the detection of the leakage, in units of the sealing portions 21, and it is possible to reduce waste in the work of the reattachment.

Next, a specific configuration of the second cover member 25 of the flow path switching device 1 according to the first embodiment will be described with reference to FIGS. 6 to 8. As described above, the second cover member 25 is attached to the surface of the second passage portion 15 of the main body member 5 by vibration welding, laser welding, or the like. The second cover member 25 includes the sealing portions 26 for sealing the opened portions of the second passage 16 formed in a groove shape, and the opening 27.

As illustrated in FIG. 6, the second cover member 25 includes the first sealing portion 26a to the fourth sealing portion 26d as the sealing portions 26. Each of the sealing portions 26 is attached, on the surface of the second passage portion 15, to seal the opened portion of the second passage portion 15.

Specifically, with reference to FIGS. 6 and 7, the first sealing portion 26a of the second cover member 25 is attached to seal the opened portion of the second passage 16 extending from the third connection port 35c. Therefore, the first sealing portion 26a is arranged to seal the inlet side of the second heat medium three-way valve 70b. The outer edge of the first sealing portion 26a is arranged along the outside of the opened portion of the second passage 16 extending from the third connection port 35c.

The second sealing portion 26b of the second cover member 25 is attached to seal the opened portion of the second passage 16 extending from the seventh connection port 35g. Therefore, the second sealing portion 26b is arranged to seal the inlet side of the first heat medium three-way valve 70a. The outer edge of the second sealing portion 26b is arranged along the outside of the opened portion of the second passage 16 extending from the seventh connection port 35g.

The third sealing portion 26c of the second cover member 25 is attached to seal the opened portions of the second passage 16 extending from the fourth connection port 35d and the second passage 16 extending from the third communication portion 13c. Therefore, the third sealing portion 26c is arranged to seal one side of the inflow outlets of the first heat medium on-off valve 80a and the inlet side of the third heat medium three-way valve 70c. The outer edge of the third sealing portion 26c is arranged along the outside of the opened portions of the second passage 16 extending from the fourth connection port 35d and the second passage 16 extending from the third communication portion 13c.

Furthermore, the fourth sealing portion 26d of the second cover member 25 is attached to seal the opened portion of the second passage 16 extending from the fifth connection port 35e. Therefore, the fourth sealing portion 26d is arranged to seal one side of the inflow outlets of the second heat medium on-off valve 80b. The outer edge of the fourth sealing portion 26d is arranged along the outside of the opened portion of the second passage 16 extending from the fifth connection port 35e.

As a result, in the flow path switching device 1 according to the first embodiment, the opened portions of all of the second passages 16 formed in the second passage portion 15 are sealed by the sealing portions 26 of the second cover member 25. That is, in the flow path switching device 1, the second passages 16 formed in the second passage portion 15 can be configured as a tubular passage through which the heat medium circulates.

In the second cover member 25, the opening 27 penetrates in the thickness direction of the second cover member 25, and is opened to communicate the side of the main body member 5 and the external side of the flow path switching device 1, as illustrated in FIGS. 7 and 8. The opening 27 of the second cover member 25 is arranged along the outer edge of the opened portion of each of the second passages 16. Therefore, in the second cover member 25, the first sealing portion 26a to the fourth sealing portion 26d are divided by the opening 27.

Here, when the flow path switching device 1 is manufactured, a leak inspection for detecting leakage of the heat medium from the second passage 16 is performed similarly to the first passage 11. When leakage of the heat medium from the second passage 16 is also detected in the leak inspection from the second passage 16, it is necessary, in order to ensure the airtightness of the second passage 16, to remove the second cover member 25 from the main body member 5 and to reattach the second cover member so as to ensure the airtightness.

For example, when the second cover member 25, having a plate shape that is of the same size as the surface of the second passage portion 15, is adopted, it has been difficult in the leak inspection to locate the position of leakage even if the leakage of the heat medium from between the second passage 16 and the second cover member 25 is detected. Since the position of the leakage position cannot be located, it has been necessary to remove the entire second cover member 25 having a plate shape and to reattach it to the surface of the second passage portion 15.

In this regard, according to the flow path switching device 1 of the first embodiment, the second cover member 25 has the sealing portions 26 and the opening 27, so that, in the leak inspection, the position of the leakage of the heat medium from the inside of the second passage 16 can be located by using the opening 27. As a result, the work of reattaching the second cover member 25, which is performed to ensure the airtightness of the second passage 16, is reduced to the minimum necessary, and workability until the completion of the manufacturing can be improved.

In addition, in the second cover member 25 of the flow path switching device 1, the sealing portions 26 are divided by the opening 27, so that it is possible to locate the position of the leakage detected in the leak inspection at least in units of the sealing portions 26. As a result, it is possible to perform the work of reattaching the second cover member 25, accompanying the detection of the leakage, in units of the sealing portions 26, and it is possible to reduce waste in the work of the reattachment.

As illustrated in FIGS. 6 and 7, the motor holder 17 is formed on the surface of the second passage portion 15. The motor holder 17 is configured to hold the electromagnetic motor 32 constituting the drive unit 30 with respect to the second passage portion 15, and has a plurality of positioning pins 17a.

Each of the positioning pins 17a is arranged at a position of the second passage portion 15 that corresponds to the opening 27 when the second cover member 25 is attached. Each of the positioning pins 17a is inserted into a holding hole (not illustrated) formed in the body of the electromagnetic motor 32, which determines a relative positional relationship of the electromagnetic motor 32 with respect to the main body member 5.

As a result, the electromagnetic motor 32 is arranged, on the surface of the second passage portion 15, inside the opening 27 of the second cover member 25. Since the relative positional relationship of the electromagnetic motor 32 with respect to the main body member 5 is determined by the motor holder 17, the relative position of the drive shaft 32a of the electromagnetic motor 32 with respect to the main body member 5 can be accurately determined.

In the flow path switching device 1, the driving force of the electromagnetic motor 32 is transmitted from the drive shaft 32a to the valve body portions 73 of the respective heat medium three-way valve 70 and heat medium on-off valve 80 via the link disc 33 and the link levers 34, as illustrated in FIGS. 2 and 8.

As described above, the second passages 16, including the first heat medium three-way valve 70a to the third heat medium three-way valve 70c, the first heat medium on-off valve 80a, and the second heat medium on-off valve 80b, are sealed by the respective sealing portions 26 of the second cover member 25. Therefore, the link levers 34 connected to the valve body portions 73 are connected to the link disc 33 arranged inside the casing 31 of the drive unit 30 via the respective sealing portions 26.

In this regard, in the flow path switching device 1 according to the first embodiment, the respective sealing portions 26 of the second cover member 25 are divided by the opening 27, so that the relative positional relationships of the respective link levers 34 with respect to the main body member 5 can be adjusted to appropriate positions.

That is, the relative positional relationships of the electromagnetic motor 32 and the link levers 34 with respect to the main body member 5 can be determined at appropriate positions, so that smooth operations of the respective valve body portions 73 via the link disc 33 can be realized. As a result, the flow path switching device 1 according to the first embodiment can reduce a work load for ensuring smooth operations of the valve body portions 73, and improve workability until the completion of the manufacturing.

Subsequently, configuration of the first heat medium check valve 60a and the like in the flow path switching device 1 will be described with reference to FIGS. 8 and 9. In the flow path switching device 1 according to the first embodiment, the first heat medium check valve 60a to the fifth heat medium check valve 60e are arranged in the first passage portion 10, as described above. As illustrated in FIG. 5, the first heat medium check valve 60a to the fifth heat medium check valve 60e are each configured by using the first passage 11 and the reinforcing portion 12 formed in the first passage 11.

In the following description, the first heat medium check valve 60a to the fifth heat medium check valve 60e may be collectively referred to as a heat medium check valve 60, unless otherwise necessary.

First, the configuration of the reinforcing portion 12 will be described with reference to FIGS. 7 and 8. The reinforcing portion 12 is formed in a wall shape so as to cross the first passage 11 formed in a groove shape. As a result, the reinforcing portion 12 enhances stiffness against a load in the width direction of the first passage 11 having a groove shape.

In each of the reinforcing portions 12, a passage hole 12a is formed. The passage hole 12a penetrates, in the thickness direction, the reinforcing portion 12 having a wall shape, and is configured such that the heat medium in the first passage 11 circulates therethrough. The inner diameter of the passage hole 12a is formed to be smaller than the outer diameter of a spherical valve body 62 to be described later. The passage hole 12a constitutes a valve seat on which the spherical valve body 62 is seated when the heat medium flows in from the outlet side of the heat medium check valve 60.

Figure 9:
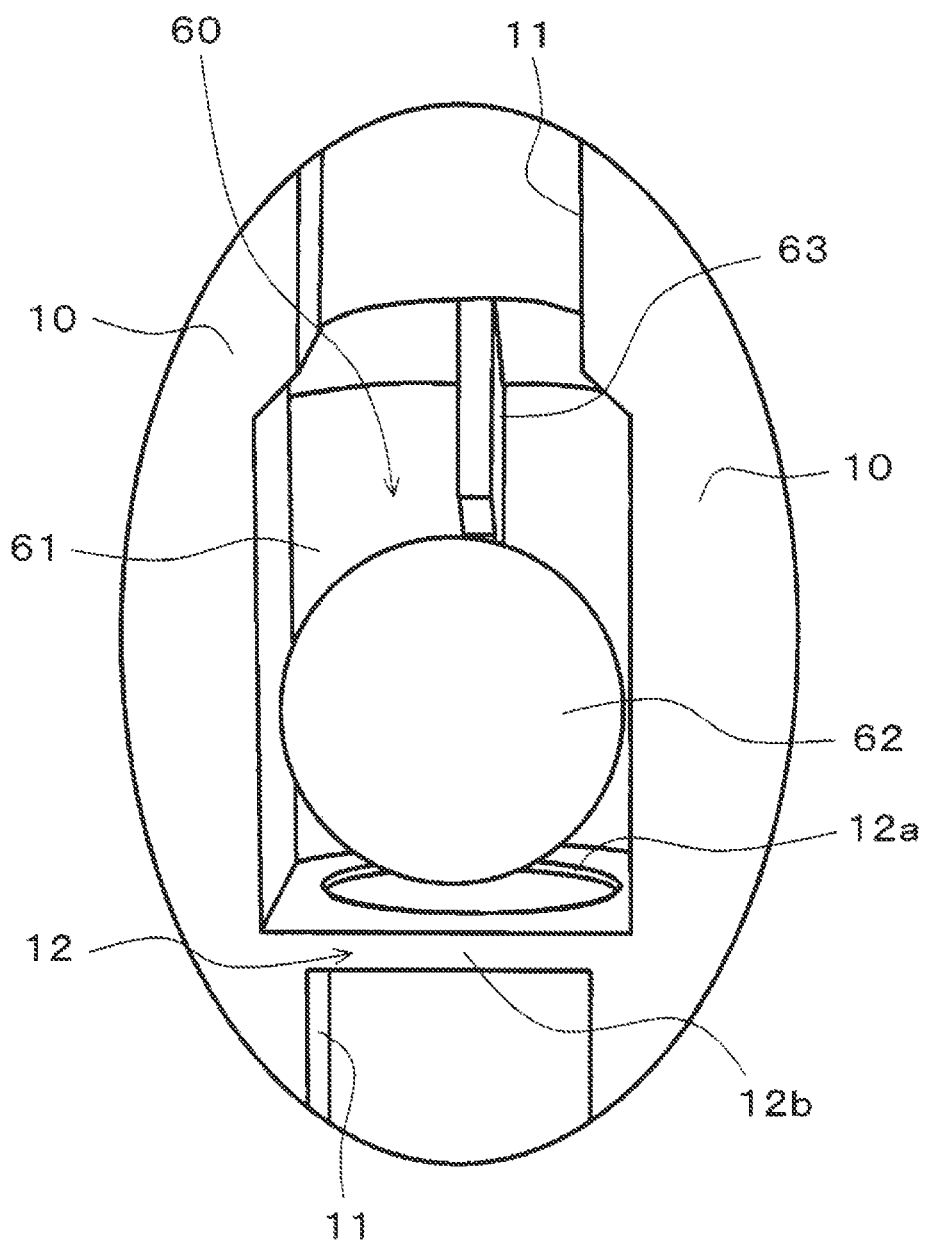
FIG. 9 is an explanatory view illustrating a configuration of a heat medium check valve in the flow path switching device.

As illustrated in FIG. 9, the reinforcing portion 12 has the joint surface 12b. The joint surface 12b of the reinforcing portion 12 is configured by connecting the surface on the side of the first passage portion 10 so as to cross the first passage 11. When the sealing portions 21 of the first cover member 20 are attached to the surface of the first passage portion 10, the joint surface 12b comes into contact with the surfaces of the respective sealing portions 21, as illustrated in FIG. 8.

Here, according to the flow path switching device 1 of the first embodiment, the outer edge portions of the two sealing portions 21 of the first cover member 20 are joined to the joint surface 12b of the reinforcing portion 12 by laser welding or the like. As a result, in the flow path switching device 1, the joint strength of the first cover member 20 with respect to the main body member 5 can be improved, and occurrence of leakage of the fluid from the first passage 11 can be reduced.

As illustrated in FIGS. 8 and 9, the joint surface 12b is formed by connecting the surface of the first passage portion 10, so that when laser welding or the like is adopted, a change in setting of a focal length and the like can be minimized, and continuous joining work can be performed.

By forming the passage hole 12a in the reinforcing portion 12, the reinforcing portion 12 changes the passage cross-sectional area of the first passage 11 so as to be reduced. Therefore, the reinforcing portion 12 has a role as a passage resistance portion that increases a passage resistance for the heat medium flowing through the first passage 11.

As illustrated in FIGS. 5, 8, and the like, each of the heat medium check valves 60 includes a valve body housing portion 61 formed by using a part of the first passage 11. The valve body housing portion 61 is arranged adjacent to the reinforcing portion 12 in the first passage 11, and is responsible for the configuration, on the outlet side, of the heat medium check valve 60.

The valve body housing portion 61 is a part of the first passage 11 adjacent to the reinforcing portion 12, and houses the spherical valve body 62 therein. The spherical valve body 62 is configured to move inside the valve body housing portion 61 according to the flow of the heat medium in the first passage 11 including the valve body housing portion 61.

The bottom surface of the valve body housing portion 61 is formed in a curved surface shape whose central portion in the width direction is recessed. As a result, it is possible to make a difference between the flow of the heat medium above the spherical valve body 62 and the flow of the heat medium below the spherical valve body 62, which can suppress a backflow in the spherical valve body 62.

As illustrated in FIGS. 8 and 9, a passage-side regulating piece 63 is arranged on the bottom surface of the valve body housing portion 61. The passage-side regulating piece 63 is a protruding piece formed to protrude from the bottom surface of the valve body housing portion 61 along a direction in which the first passage 11 including the valve body housing portion 61 extends, which corresponds to an example of a regulating piece. The passage-side regulating piece 63 comes into contact with the spherical valve body 62 to regulate a moving range, inside the valve body housing portion 61, of the spherical valve body 62, which ensures the outflow of the heat medium from the outlet of the heat medium check valve 60.

As illustrated in FIG. 8, a cover-side regulating piece 64 is formed in the sealing portion 21 of the first cover member 20 that seals the opened portion of the first passage 11 including the valve body housing portion 61. The cover-side regulating piece 64 is a protruding piece protruding from the sealing portion 21 toward the inside of the valve body housing portion 61, which corresponds to an example of the regulating piece. As a result, the passage-side regulating piece 63 and the cover-side regulating piece 64 cooperate with each other, so that the moving range of the spherical valve body 62 in the valve body housing portion 61 can be reliably regulated.

In the flow path switching device 1 according to the first embodiment, the first heat medium check valve 60a to the fifth heat medium check valve 60e are configured by using five reinforcing portions 12 and the like formed in the first passages 11. The operations of the heat medium check valves 60 will be described with reference to FIG. 8 by taking the second heat medium check valve 60b as a specific example.

In the example illustrated in FIG. 8, when the heat medium flows from the eleventh connection portion 90k to the fifth connection portion 90e, the spherical valve body 62 moves, according to the flow of the heat medium, toward the heat medium outlet side in the valve body housing portion 61 of the second heat medium check valve 60b.

As a result, the passage hole 12a in the second heat medium check valve 60b is opened, and the flow of heat medium from the side of the eleventh connection portion 90k toward the fifth connection portion 90e is allowed. At this time, the spherical valve body 62 comes, inside the valve body housing portion 61, into contact with the passage-side regulating piece 63 and the cover-side regulating piece 64 to regulate the movement to the heat medium outlet side, so that the heat medium does not flow out from the valve body housing portion 61 to the outside. The spherical valve body 62 does not seal the heat medium outlet from the inside of the valve body housing portion 61.

On the other hand, when the heat medium flows from the fifth connection portion 90e to the eleventh connection portion 90k, the spherical valve body 62 moves, according to the flow of the heat medium, toward the heat medium inlet side and is seated in the passage hole 12a inside the valve body housing portion 61 of the second heat medium check valve 60b. As a result, the passage hole 12a of the second heat medium check valve 60b is sealed by the spherical valve body 62, and the flow of the heat medium from the fifth connection portion 90e to the eleventh connection portion 90k is prohibited.

In the flow path switching device 1 according to the first embodiment, each of the first heat medium check valve 60a to the fifth heat medium check valve 60e performs opening/closing operations according to the direction of the flow of the heat medium, as described above. As a result, the flow path switching device 1 can appropriately switch the passage configuration of the heat medium circuit 50.

As illustrated in FIG. 5, the valve body housing portion 61 is arranged on one side (upper side in FIG. 5) with respect to the reinforcing portion 12 in any of the first heat medium check valve 60a to the fifth heat medium check valve 60e. With such an arrangement, a mold can be removed in the same direction when the reinforcing portion 12 and the valve body housing portion 61 are formed, by the mold, in the first passage 11 in the first passage portion 10. As a result, it is possible to improve work efficiency when the heat medium check valves 60 are formed in the first passage 11.

Next, configurations of the first heat medium three-way valve 70a and the like in the flow path switching device 1 will be described with reference to the drawings. In the flow path switching device 1 according to the first embodiment, the first heat medium three-way valve 70a, the second heat medium three-way valve 70b, and the third heat medium three-way valve 70c are arranged as described above.

Figure 10:
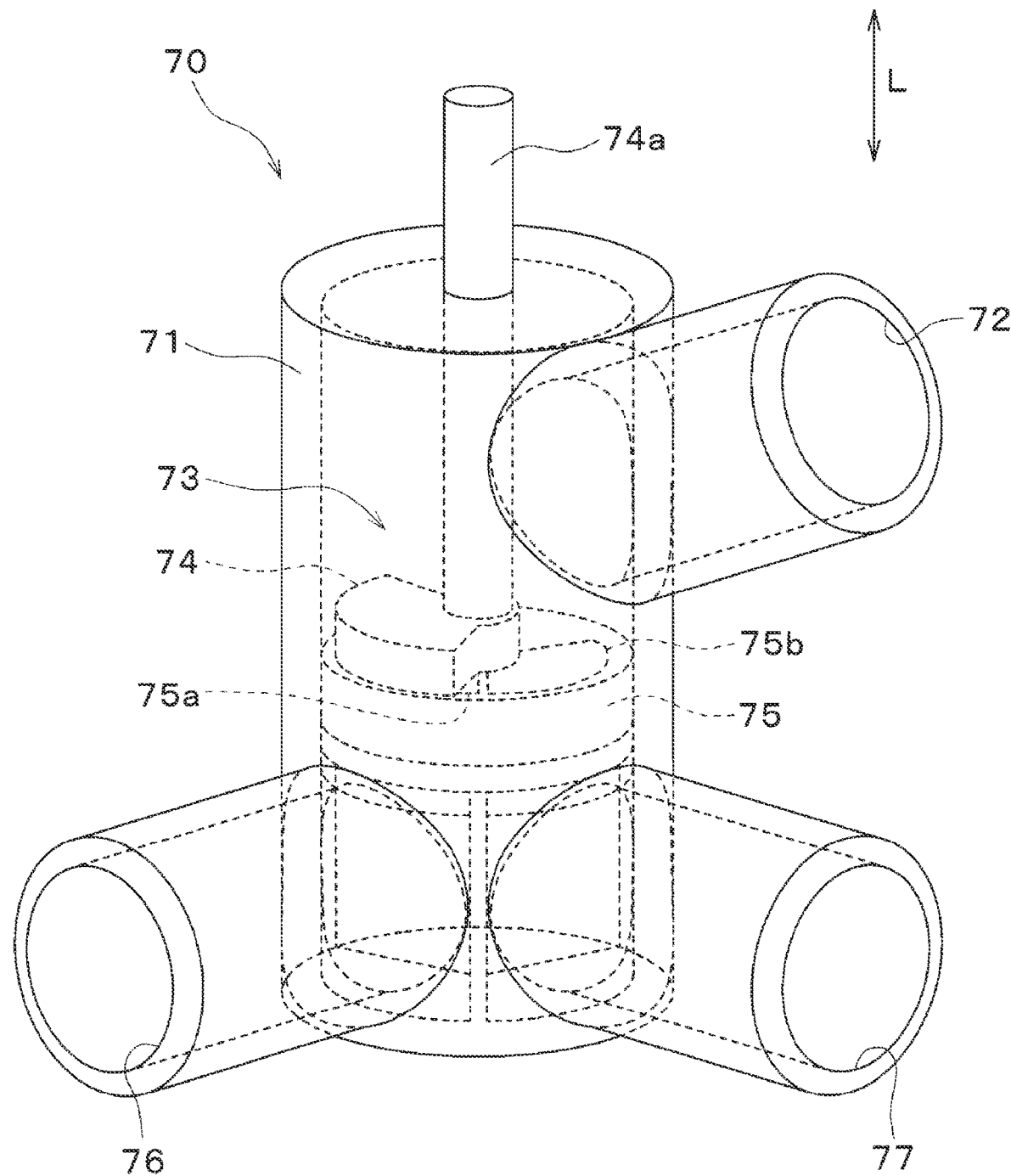
FIG. 10 is an explanatory view illustrating a schematic configuration of a heat medium three-way valve in the flow path switching device according to the first embodiment.

In the following description, the first heat medium three-way valve 70a to the third heat medium three-way valve 70c may be collectively referred to as a heat medium three-way valve 70, unless otherwise necessary. FIG. 10 is an explanatory view illustrating a basic configuration of the heat medium three-way valve 70.

As illustrated in FIG. 10, the heat medium three-way valve 70 is a three-way flow control valve capable of adjusting a flow rate ratio between the flow rate of, of the heat medium flowing in from a heat medium inlet 72, the heat medium flowing out of a first heat medium outlet 76 and the flow rate of the heat medium flowing out of a second heat medium outlet 77.

In the first heat medium three-way valve 70a, the second passage 16 extending from the seventh connection port 35g corresponds to the heat medium inlet 72. The first passage 11 extending to the first connection portion 90a and the first passage 11 extending to the eighth connection portion 90h correspond to the first heat medium outlet 76 and the second heat medium outlet 77.

In the case of the second heat medium three-way valve 70b, the second passage 16 extending from the third connection port 35c corresponds to the heat medium inlet 72. The first passage 11 extending to the second connection portion 90b and the first passage 11 extending to the fifth connection portion 90e correspond to the first heat medium outlet 76 and the second heat medium outlet 77.

In the case of the third heat medium three-way valve 70c, the second passage 16 extending from the third communication portion 13c corresponds to the heat medium inlet 72. The first passage 11 extending to the ninth connection port 35i and the first passage 11 extending to the tenth connection port 35j correspond to the first heat medium outlet 76 and the second heat medium outlet 77.

As illustrated in FIG. 10, the heat medium three-way valve 70 is formed in a tubular shape extending in the stacking direction L. Therefore, in the first heat medium three-way valve 70a to the third heat medium three-way valve 70c, a communication passage that communicates the second passage 16 and the first passage 11 in the stacking direction L corresponds to a housing 71.

The valve body portions 73 are arranged inside the housing 71. The valve body portion 73 includes a drive disc 74 and a fixed disc 75. The fixed disc 75 is arranged to divide the housing 71 in the stacking direction L, and has a first communication passage 75a and a second communication passage 75b.

The first communication passage 75a penetrates the fixed disc 75 in the thickness direction thereof, and communicates a space on the side of the heat medium inlet 72 and a space on the side of the first heat medium outlet 76. The second communication passage 75b penetrates the fixed disc 75 in the thickness direction thereof at a position adjacent to the first communication passage 75a. The second communication passage 75b communicates the space on the side of the heat medium inlet 72 and a space on the side of the second heat medium outlet 77.

In the housing 71, the space on the side of the first heat medium outlet 76 and the space on the side of the second heat medium outlet 77 are partitioned. Therefore, the heat medium does not flow in and out between the space on the side of the first heat medium outlet 76 and the space on the side of the second heat medium outlet 77 without passing through the first communication passage 75a and the second communication passage 75b.

The drive disc 74 is arranged along the surface, on the side of the heat medium inlet 72, of the fixed disc 75, and is formed in a substantially fan-shaped plate shape. The drive disc 74 is formed in a size capable of sealing at least one of the first communication passage 75a and the second communication passage 75b. The drive disc 74 is fixed to the rotating shaft 74a constituting the valve body portion 73.

Therefore, the drive disc 74 slides on the surface of the fixed disc 75 as the rotating shaft 74a rotates. As described above, the rotating shaft 74a reaches the inside of the drive unit 30 via a through hole of the second cover member 25. As illustrated in FIGS. 2 and 8, the rotating shaft 74a in the drive unit 30 is connected to the link lever 34. Therefore, the drive disc 74 slides on the surface of the fixed disc 75 as the electromagnetic motor 32 operates.

That is, the heat medium three-way valve 70 can change the position of the drive disc 74 with respect to the fixed disc 75 by controlling the operation of the drive unit 30. As a result, the heat medium three-way valve 70 can adjust a flow rate ratio between the flow rate of the heat medium flowing out of the first heat medium outlet 76 and the flow rate of the heat medium flowing out of the second heat medium outlet 77. The heat medium three-way valve 70 can allow the heat medium to flow out of either of the two outlets.

Therefore, according to the flow path switching device 1 of the first embodiment, the passage configuration of the heat medium circuit 50 can be appropriately switched by controlling the operations of the valve body portions 73 of the first heat medium three-way valve 70a to the third heat medium three-way valve 70c.

As described above, the first heat medium on-off valve 80a and the second heat medium on-off valve 80b are arranged in the flow path switching device 1 according to the first embodiment. In the following description, a heat medium on-off valve 80 is used as a general term for the first heat medium on-off valve 80a and the second heat medium on-off valve 80b.

The heat medium on-off valve 80 according to the first embodiment has the same basic configuration as the heat medium three-way valve 70 except that there is one heat medium outlet and one communication passage in the fixed disc 75. Therefore, the heat medium on-off valve 80 has the valve body portion 73. In the valve body portion 73 of the heat medium on-off valve 80, one communication passage configured similarly to the first communication passage 75a is formed in the fixed disc 75. By opening and closing the communication passage by the drive disc 74, opening and closing operations of the heat medium on-off valve 80 are realized, and the presence or absence of the flow out of the heat medium from the heat medium outlet in the heat medium check valve 60 can be switched.

Therefore, according to the flow path switching device 1 of the first embodiment, the passage configuration of the heat medium circuit 50 can be appropriately switched by controlling the operations of the valve body portions 73 of the first heat medium on-off valve 80a and the second heat medium on-off valve 80b.

As described above, according to the flow path switching device 1 of the first embodiment, the first passage portion 10, the second passage portion 15, and the drive unit 30 are stacked and arranged in this order, so that it is possible to switch the passage configuration of the heat medium circuit 50 by a compact configuration.

As illustrated in FIG. 4, the first cover member 20 of the flow path switching device 1 has the sealing portions 21 and the opening 23, so that it is possible to easily locate a position where the fluid flowing through the first passage 11 leaks from between the sealing portion 21 of the first cover member 20 and the first passage portion 10. Therefore, the flow path switching device 1 can improve work efficiency in detecting leakage of the fluid and rejoining the sealing portion 21 in a leak inspection, and can improve workability in manufacturing the flow path switching device 1.

As illustrated in FIGS. 4 and 5, the sealing portions 21 of the first cover member 20 partially seal the opened portion of the first passage 11, and are divided by the opening 23. The first cover member 20 seals all of the opened portions of the first passages 11 having a groove shape by the sealing portions 21.

Therefore, according to the flow path switching device 1, it is possible, in a leak inspection for the first passage 11, to detect the presence or absence of the leakage of the fluid from the first passage 11 for at least each portion of the first passage 11, and it is possible to easily locate the position of the leakage. Furthermore, the sealing portion 21 where leakage has occurred can be rejoined independently of the work on the sealing portions 21 where no leakage has occurred, so that a work load in rejoining the first cover member 20 can be reduced to the minimum necessary.

As illustrated in FIGS. 5 and 9, the reinforcing portion 12 is formed inside the first passage 11. The reinforcing portion 12 has the joint surface 12b that crosses, in the width direction, the first passage 11 formed in a groove shape and extends along the surface of the first passage portion 10. As illustrated in FIGS. 4 and 8, the outer edges of at least two sealing portions 21 of the first cover member 20 are joined to the joint surface 12b of the reinforcing portion 12.

As described above, the reinforcing portion 12 is formed to cross the first passage 11 in the width direction, so that the flow path switching device 1 can enhance the stiffness against a load in the width direction of the first passage 11 by the reinforcing portion 12. Since the outer edges of at least two sealing portions 21 are joined to the joint surface 12b, the joint strength of the first cover member 20 to the surface of the first passage portion 10 can be improved. Since the joint surface 12b extends along the surface of the first passage portion 10 and a change in setting and the like can be reduced, it is possible to improve workability in the work of joining each of the sealing portions 21.

As illustrated in FIGS. 8 and 9, the passage hole 12a is formed in the reinforcing portion 12, and the valve body housing portion 61 for housing the spherical valve body 62 is formed at a position adjacent to the reinforcing portion 12. In addition, the passage-side regulating piece 63 and the cover-side regulating piece 64 are arranged inside the valve body housing portion 61.

As a result, the flow path switching device 1 can arrange the heat medium check valve 60 on the first passage 11 by using the first passage 11 and the reinforcing portion 12. That is, the flow path switching device 1 can realize a compact configuration capable of switching the passage configuration by using the heat medium check valve 60.

As illustrated in FIG. 6, the second cover member 25 of the flow path switching device 1 has the sealing portions 26 and the opening 27, so that it is possible to easily locate a position where the fluid flowing through the second passage 16 leaks from between the sealing portion 26 of the second cover member 25 and the second passage portion 15. Therefore, the flow path switching device 1 can improve work efficiency in detecting leakage of the fluid and rejoining the sealing portion 26 in a leak inspection, and can improve workability in manufacturing the flow path switching device 1.

As illustrated in FIGS. 2 and 8, the drive unit 30 has the electromagnetic motor 32, and the motor holder 17 is formed on the surface of the second passage portion 15. As illustrated in FIG. 6, the motor holder 17 is formed at a position that corresponds to the opening 27 when the second cover member 25 is attached to the second passage portion 15.

With such a configuration, the valve body portion 73 and the like and the drive shaft 32a of the electromagnetic motor 32 are arranged with the main body member 5 as a reference, and relative positional relationships among the respective members can be accurately determined. As a result, by enhancing the accuracy of the relative positional relationship between the electromagnetic motor 32 and the valve body portion 73, it is possible to improve workability in such as work of attaching a configuration for transmitting the driving force of the electromagnetic motor 32 to the valve body portion 73.

Second Embodiment

Next, a second embodiment different from the first embodiment will be described with reference to FIGS. 11 and 12. The second embodiment is different from the first embodiment in the configuration of the heat medium on-off valve 80 arranged in the flow path switching device 1. The configurations, such as the basic configurations of the flow path switching device 1 and the heat medium circuit 50, are the same as those of the first embodiment, so that repetitive description will be omitted.

In the first embodiment described above, the heat medium on-off valve 80 is configured to open and close the communication passage leading from the second passage 16 to the first passage 11. In this regard, a heat medium on-off valve 80 of the second embodiment is configured to open and close a passage in either the first passage 11 or the second passage 16.

Figure 11:
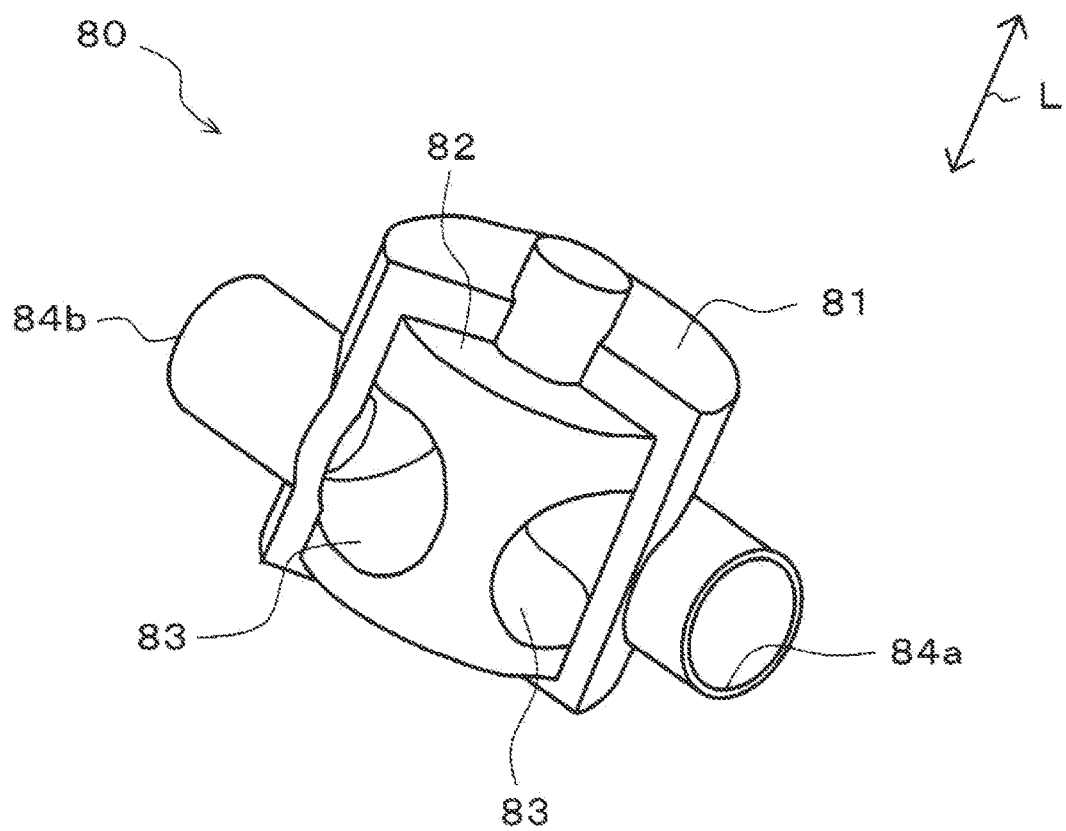
FIG. 11 is an explanatory view illustrating a schematic configuration of a heat medium on-off valve in a flow path switching device according to a second embodiment.

As illustrated in FIG. 11, the heat medium on-off valve 80 according to the second embodiment is configured such that a valve body portion 82 is housed in a main body portion 81 formed in a cylindrical shape. The main body portion 81 is housed in the first passage 11 or the second passage 16, and has a first inflow outlet 84a and a second inflow outlet 84b.

The valve body portion 82 is formed in a cylindrical shape, and an internal passage 83 is formed therein. The internal passage 83 is formed to be capable of communicating the first inflow outlet 84a and the second inflow outlet 84b in the main body portion 81. According to the flow path switching device 1, the positions of the internal passage 83 of the valve body portion 82 with respect to the first inflow outlet 84a and the second inflow outlet 84b in the main body portion 81 can be adjusted by controlling the operation of the drive unit 30.

That is, the heat medium on-off valve 80 constitutes a so-called rotary valve that rotates the valve body portion 82 having a cylindrical shape. As a result, the heat medium on-off valve 80 can switch the presence or absence of the flow of the heat medium from either the first inflow outlet 84a or the second inflow outlet 84b to the other.

Figure 12:
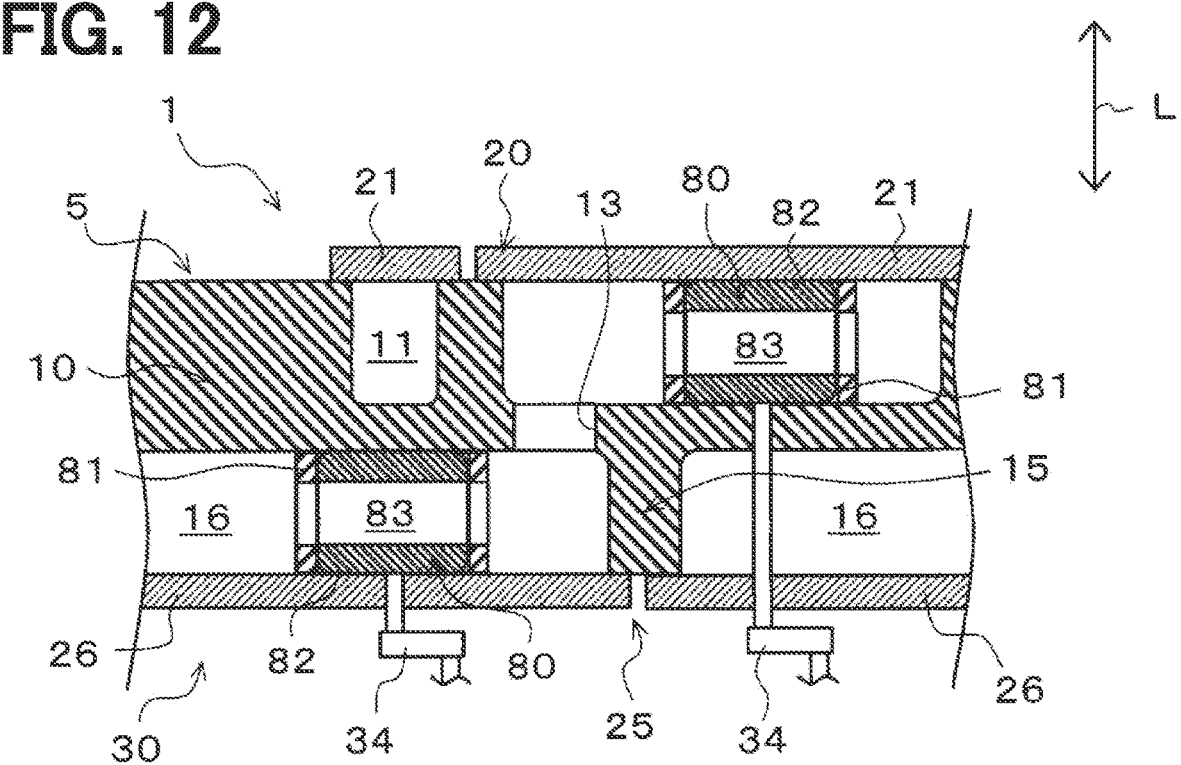
FIG. 12 is a cross-sectional view illustrating an internal configuration of the flow path switching device according to the second embodiment.

As illustrated in FIG. 12, when the heat medium on-off valve 80 of the second embodiment is arranged to be connected to the communication portion 13 communicating the first passage 11 and the second passage 16, the same effects as those of the heat medium on-off valve 80 of the first embodiment can be exhibited.

For example, when the heat medium on-off valves 80 on the side of the first passage 11 and on the side of the second passage 16 in FIG. 12 are opened, the flow of the heat medium between the first passage 11 and the second passage 16 via the communication portion 13 is allowed.

When either of the heat medium on-off valves 80 on the side of the first passage 11 and on the side of the second passage 16 is closed, the flow of the heat medium between the first passage 11 and the second passage 16 via the communication portion 13 is prohibited.

The configuration of the heat medium on-off valve 80 according to the second embodiment can also be adopted in the heat medium three-way valve 70. The heat medium three-way valve 70 in this case is configured to be capable of switching the outflow destination of the fluid in either the first passage 11 or the second passage 16. Specifically, three inflow outlets are formed in the main body portion of the heat medium three-way valve 70 in this case, and the internal passage of the valve body portion is formed to be capable of communicating at least two of the three inflow outlets.

As described above, when the three-way valve of a rotary valve type is adopted, the flow path switching device 1 can switch the outflow destination of the fluid in either the first passage 11 or the second passage 16.

As described above, according to the flow path switching device 1 of the second embodiment, it is possible to obtain the operational effects exerted from the configuration and operation common to the first embodiment described above, similarly to the first embodiment, even when the configuration of the heat medium on-off valve 80 is changed.

Third Embodiment

Subsequently, a third embodiment different from the embodiments described above will be described with reference to FIGS. 13 and 14. In a flow path switching device 1 according to the third embodiment, a heat medium switch valve 85 is arranged instead of the heat medium three-way valve 70 in the embodiments described above. The configurations, such as the basic configurations of the flow path switching device 1 and the heat medium circuit 50, are the same as those of the embodiments described above, so that repetitive description will be omitted.

Figure 13:
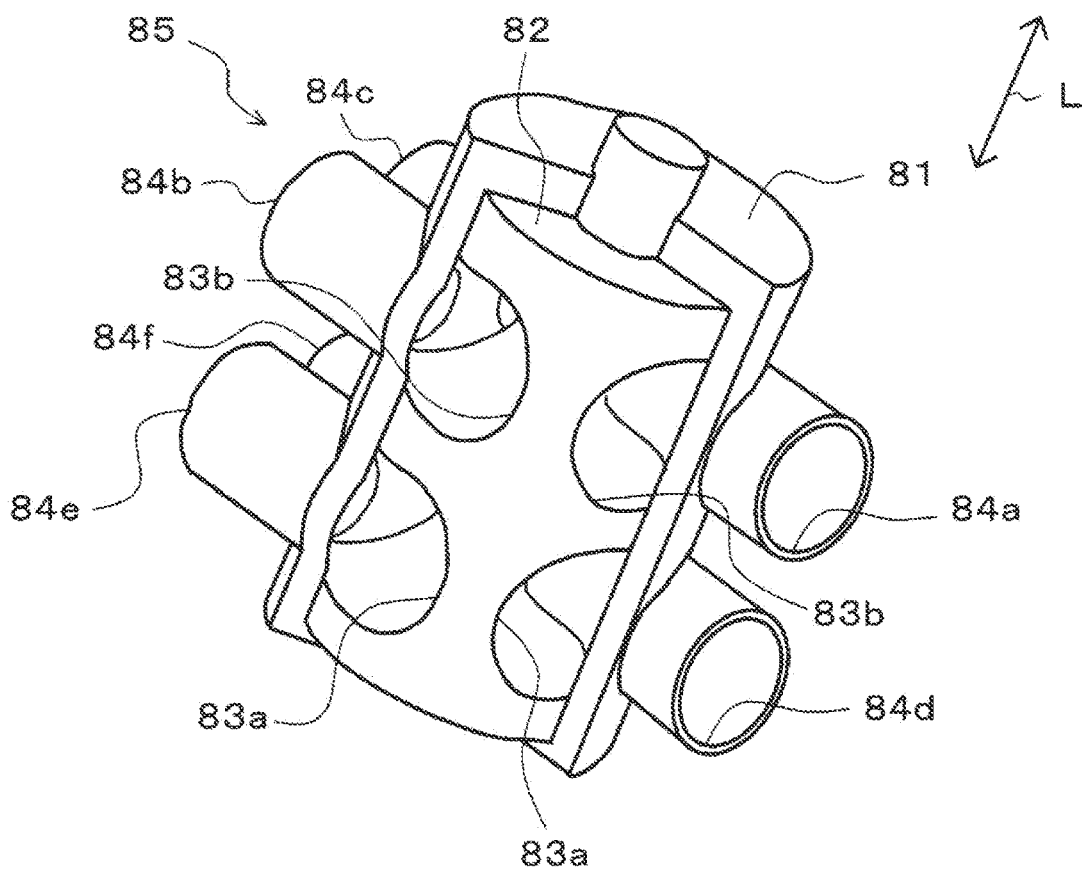
FIG. 13 is an explanatory view illustrating a schematic configuration of a heat medium switch valve in a flow path switching device according to a third embodiment.

As illustrated in FIG. 13, the heat medium switch valve 85 according to the third embodiment has a three-way valve structure for switching the flow of the heat medium in the first passage 11 and a three-way valve structure for switching the flow of the heat medium in the second passage 16. The heat medium switch valve 85 can simultaneously perform a switching operation in the first passage 11 and a switching operation in the second passage 16.

Specifically, a configuration of the heat medium switch valve 85 according to the third embodiment will be described. As illustrated in FIG. 13, the heat medium switch valve 85 is configured such that the valve body portion 82 is housed in a main body portion 81 formed in a cylindrical shape. The main body portion 81 is formed in a cylindrical shape extending in the stacking direction L, and at least a part thereof is housed in the first passage 11 and the other part thereof is housed in the second passage 16.

A first inflow outlet 84a, a second inflow outlet 84b, and a third inflow outlet 84c are formed in a portion of the main body portion 81 that is arranged in the second passage 16. The first inflow outlet 84a to the third inflow outlet 84c are respectively connected to the different portions of the second passage 16.

In addition, a fourth inflow outlet 84d, a fifth inflow outlet 84e, and a sixth inflow outlet 84f are formed in a portion of the main body portion 81 that is arranged in the first passage 11. The fourth inflow outlet 84d to the sixth inflow outlet 84f are respectively connected to the different portions of the first passage 11.

The valve body portion 82 in the third embodiment is formed in a cylindrical shape, and a first internal passage 83a and a second internal passage 83b are formed therein. The first internal passage 83a and the second internal passage 83b are formed to be aligned in the stacking direction L in the valve body portion 82.

The first internal passage 83a has a configuration in which three linear passages are connected at one place, and is formed to be capable of communicating at least two of the fourth inflow outlet 84d to the sixth inflow outlet 84f. Similarly, the second internal passage 83b has a configuration in which three linear passages are connected at one place, and is configured to be capable of communicating at least two of the first inflow outlet 84a to the third inflow outlet 84c.

Figure 14:
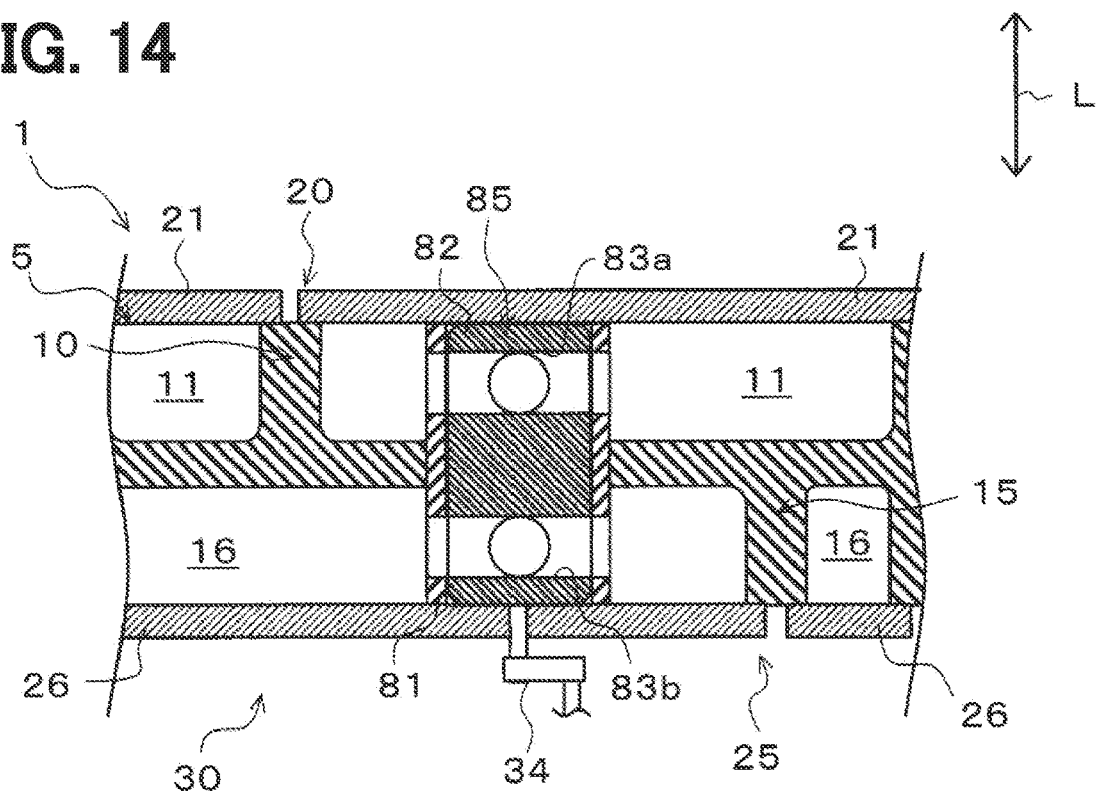
FIG. 14 is a cross-sectional view illustrating an internal configuration of the flow path switching device according to the third embodiment.

The flow path switching device 1 rotates the valve body portion 82 inside the main body portion 81 by controlling the operation of the drive unit 30. As described above, the valve body portion 82 has the first internal passage 83a and the second internal passage 83b. Therefore, the positions of the first internal passage 83a with respect to the fourth inflow outlet 84d to the sixth inflow outlet 84f and the positions of the second internal passage 83b with respect to the first inflow outlet 84a to the third inflow outlet 84c can be simultaneously adjusted, as illustrated in FIG. 14.

That is, in the flow path switching device 1 according to the third embodiment, the passage configuration, for the heat medium, of the first passage 11 and the passage configuration, for the heat medium, of the second passage 16 can be simultaneously switched by rotating the valve body portion 82 of the heat medium switch valve 85.

As described above, according to the flow path switching device 1 of the third embodiment, it is possible to obtain the operational effects exerted from the configuration and operation common to the embodiments described above, similarly to the embodiments described above, even when the heat medium switch valve 85 is adopted.

Fourth Embodiment

Next, a fourth embodiment different from the embodiments described above will be described with reference to FIGS. 15 and 16. In a flow path switching device 1 according to the fourth embodiment, the configurations of a first cover member 20 and a second cover member 25 are different from those of the embodiments described above. Therefore, the configurations, such as the basic configurations of the flow path switching device 1 and the heat medium circuit 50, are similar to those of the embodiments described above, so that repetitive description will be omitted.

Figure 15:
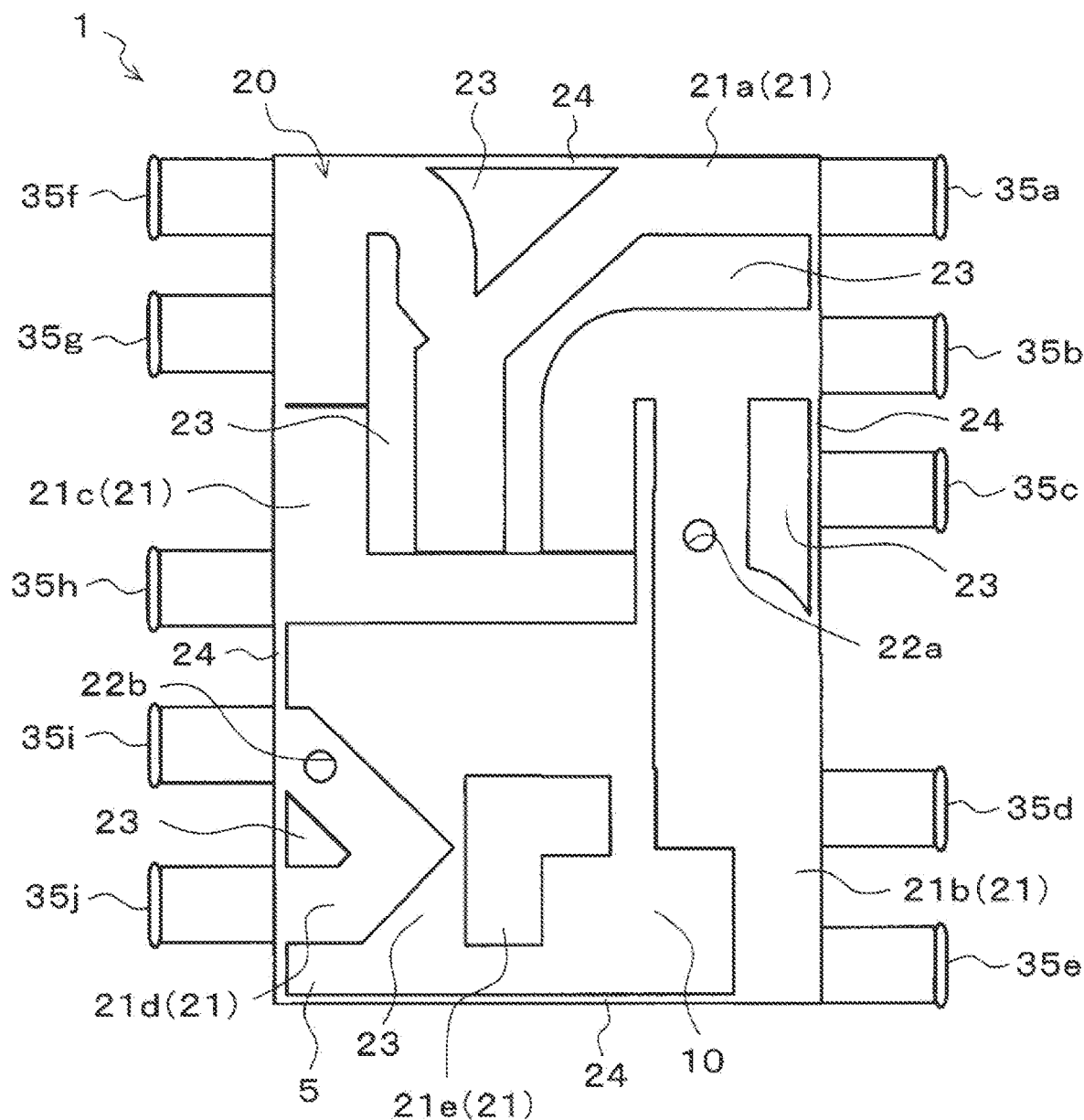
FIG. 15 is a plan view of a first passage portion of a flow path switching device according to a fourth embodiment.

As illustrated in FIG. 15, the first cover member 20 of the fourth embodiment has a frame-shaped portion 24 in addition to the sealing portions 21 and the opening 23. The frame-shaped portion 24 is a frame-shaped member arranged along the outer edge of the surface of the first passage portion 10, and connects among the sealing portions 21.

Even with such a configuration, the sealing portions 21 and the opening 23 are formed in the first cover member 20, so that it is possible, in a leak inspection in manufacturing the flow path switching device 1, to easily locate the position of leakage of the heat medium that has occurred in the first passage 11.

Figure 16:
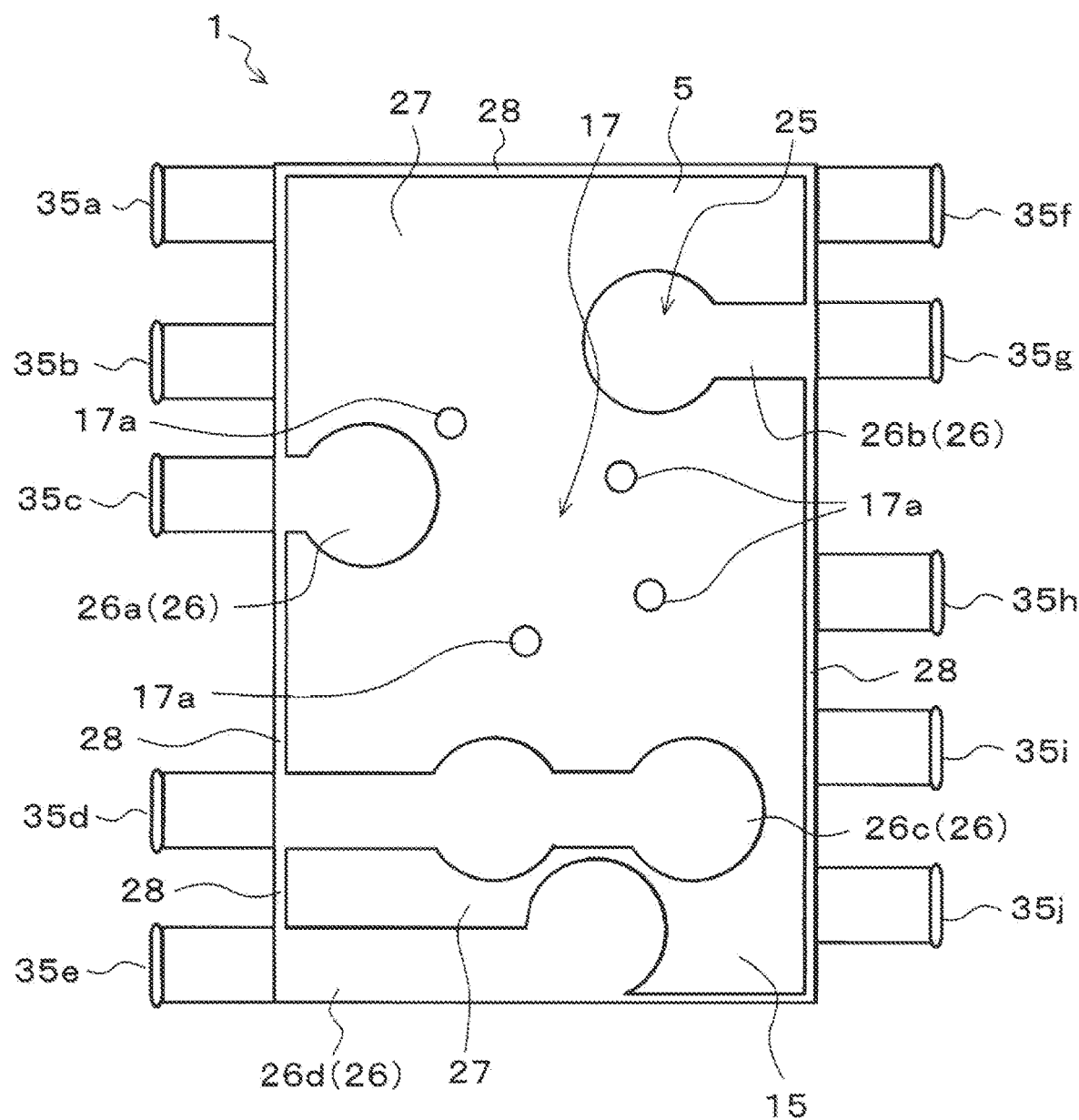
FIG. 16 is a plan view of a second passage portion of the flow path switching device according to the fourth embodiment.

As illustrated in FIG. 16, the second cover member 25 of the fourth embodiment has a frame-shaped portion 28 in addition to the sealing portions 26 and the opening 27. The frame-shaped portion 28 is a frame-shaped member arranged along the outer edge of the surface of the second passage portion 15, and connects among the sealing portions 26.

Even with such a configuration, the sealing portions 26 and the opening 27 are formed in the second cover member 25, so that it is possible, in a leak inspection in manufacturing the flow path switching device 1, to easily locate the position of leakage of the heat medium that has occurred in the second passage 16.

As described above, according to the flow path switching device 1 of the fourth embodiment, it is possible to obtain the operational effects exerted from the configuration and operation common to the embodiments described above, similarly to the embodiments described above, even when the frame-shaped portions are provided in the first cover member 20 and the second cover member 25.

Although the embodiments have been described above, the present disclosure is not limited to the embodiments described above at all. That is, various improvements and changes can be made without departing from the gist of the present disclosure.

In the embodiments described above, the second sealing portion 21b of the first cover member 20 seals, as one member, the opened portions between the valve body housing portion 61 of the third heat medium check valve 60c and the second communication portion 13b and between the valve body housing portion 61 of the fifth heat medium check valve 60e and the first communication portion 13a. However, the configuration of the second sealing portion 21b is not limited to this aspect.

That is, the second sealing portion 21b may be divided at the positions of the reinforcing portions 12 related to the third heat medium check valve 60c and the fifth heat medium check valve 60e, and the outer edge of the sealing portions 21 may be joined at the joint surface 12b between the respective reinforcing portions 12.

Specifically, for example, regarding the opened portion of the third heat medium check valve 60c, the opened portion related to the valve body housing portion 61 of the third heat medium check valve 60c is sealed by the second sealing portion 21b. Then, the opened portion, related from the reinforcing portion 12 of the third heat medium check valve 60c to the second communication portion 13b, is configured to be sealed by the sealing portion 21 as a separate member. With such a configuration, the outer edge of the sealing portions 21 can be joined to improve the joint strength, even at the joint surface 12b in the reinforcing portion 12 of the third heat medium check valve 60c. Description of a specific example of the fifth heat medium check valve 60e will be omitted.

In the drive unit 30 of the embodiments described above, the driving force of the electromagnetic motor 32 is transmitted to the valve body portions 73 and the like via the link disc 33 and the link levers 34, but the present disclosure is not limited to this aspect. Various aspects can be adopted as long as the driving force of the electromagnetic motor 32 can be transmitted to the valve body portions 73. For example, as a configuration of the drive unit 30, the driving force of the electromagnetic motor 32 may be transmitted to the valve body portions 73 via a gear train or a belt mechanism.

In the embodiments described above, the link disc 33 is attached to the drive shaft 32a of the electromagnetic motor 32, so that the position of the drive shaft 32a matches the rotation center of the link disc 33, but the present disclosure is not limited to this aspect. For example, as long as the driving force generated in the drive shaft 32a can be transmitted to the link disc 33 by a transmission mechanism adopting a gear train, a belt, or the like, the rotation center of the link disc 33 may be shifted from the position of the drive shaft 32a of the electromagnetic motor 32.

In the embodiments described above, the bottom surface of the valve body housing portion 61 is formed in a curved surface shape to suppress a backflow in the spherical valve body 62, as illustrated in FIG. 9, but the present disclosure is not limited to this aspect. Various aspects can be adopted as long as a difference can be made between the flow of the heat medium circulating through the bottom surface side of the valve body housing portion 61 with respect to the spherical valve body 62 and the flow of the heat medium circulating through the side of the sealing portion 21 with respect to the spherical valve body 62. For example, a recess recessed in the thickness direction of the sealing portion 21 may be formed in, of the surface of the sealing portion 21, a portion on the inner side of the valve body housing portion 61.

In addition, in the embodiments described above, an example has been described in which the flow path switching device 1 according to the present disclosure is applied to the heat medium circuit 50 in a vehicle air conditioner with an in-vehicle equipment cooling function, but the present disclosure is not limited thereto.

The flow path switching device 1 according to the present disclosure may be applied to a heat medium circuit of a stationary air conditioner or the like, without being limited to a heat medium circuit for a vehicle. For example, the flow path switching device may be applied to a heat medium circuit of an air conditioner or the like with a server cooling function in which the temperature of a server (computer) is appropriately adjusted and simultaneously a room where the server is housed is air-conditioned.

The embodiments have been described, in which an ethylene glycol aqueous solution is adopted as the heat medium in the heat medium circuit 50, but the heat medium is not limited thereto. For example, a solution containing dimethylpolysiloxane, a nanofluid, or the like, an antifreeze liquid, or the like can be adopted as the heat medium.

Although the present disclosure has been described in accordance with the embodiments, it is understood that the present disclosure is not limited to the embodiments and structures. The present disclosure also encompasses various modifications and variations within the scope of equivalents. In addition, various combinations and modes, and other combinations and modes including only one element, more elements, or less elements are also within the scope and idea of the present disclosure.

What is claimed is:

1. A flow path switching device for a fluid circuit through which a fluid circulates, the flow path switching device comprising:
   a main body member including a first passage portion and a second passage portion, the first passage portion including a first passage connected to the fluid circuit, the first passage having a groove shape where one surface of the main body member is opened, the second passage portion including a second passage connected to the fluid circuit to communicate with the first passage at a plurality of places, the second passage having a groove shape where another surface of the main body member is opened;
   a drive unit configured to drive a plurality of valve body portions in conjunction to adjust a flow rate of a fluid passing through a communication passage that communicates the first passage and the second passage;
   a first cover member attached to a surface of the first passage portion; and
   a second cover member attached to a surface of the second passage portion, wherein
   the first passage portion, the second passage portion, and the drive unit are stacked in this order, and
   the first cover member includes:
   a sealing portion arranged to seal an opened portion of the first passage; and
   an opening arranged along an outer edge of the opened portion of the first passage and formed to communicate a side of the main body member to an external side.

2. The flow path switching device according to claim 1, wherein
   the sealing portion is one of a plurality of sealing portions to seal the opened portion of the first passage that is one of a plurality of opened portions of the first passage,
   the first cover member is arranged to seal all of the plurality of opened portions of the first passage with the plurality of sealing portions respectively, and
   the plurality of sealing portions is divided from each other by the opening.

3. The flow path switching device according to claim 2, further comprising:
   the first passage includes a reinforcing portion having a joint surface crossing a width direction of the first passage formed in the groove shape, the joint surface extending along one surface of the first passage portion, and
   outer edges of at least two of the sealing portions of the first cover member are joined to the joint surface.

4. The flow path switching device according to claim 3, wherein
   the reinforcing portion has a passage hole through which a fluid flowing through the first passage circulates,
   a valve body housing portion is formed in the first passage at a position adjacent to the reinforcing portion, so as to house a valve body configured to block the passage hole by moving with a flow of the fluid, and
   the valve body housing portion includes a regulating piece configured to regulate movement of the valve body in a direction away from the passage hole.

5. The flow path switching device according to claim 1, wherein the second cover member includes: a plurality of sealing portions arranged to seal an opened portion of the second passage; and an opening arranged along an outer edge of the opened portion of the second passage and formed to communicate a side of the main body member to an external side.

6. The flow path switching device according to claim 5, wherein
   the drive unit includes a motor that is a drive source, and
   a motor holder for holding the motor with respect to the main body member is formed on the second passage portion, at a position located inside the opening.

\* \* \* \* \*